United States Patent [19]
Eto et al.

[11] Patent Number: 5,561,763
[45] Date of Patent: Oct. 1, 1996

[54] METHOD AND APPARATUS FOR TESTING AN APPLICATION IN A CLIENT/SERVER DATABASE SYSTEM USING PSEUDO-DATABASE SERVER AND DEBUGGER PROCESSES

[75] Inventors: Toshihisa Eto; Tsuneichi Yoshizawa; Koichi Shiga, all of Kawasaki, Japan

[73] Assignee: Fujitsu Limited, Kawasaki, Japan

[21] Appl. No.: 381,071

[22] Filed: Jan. 31, 1995

[30]     Foreign Application Priority Data

Feb. 10, 1994  [JP]  Japan ..................... 6-016846

[51] Int. Cl.$^6$ ................................. G06F 11/00
[52] U.S. Cl. ................ 395/183.11; 395/600; 395/183.14
[58] Field of Search .......................... 395/183.11, 182.16, 395/182.17, 182.18, 600, 650, 183.14

[56]              References Cited

U.S. PATENT DOCUMENTS 4,819,160  4/1989  Tanka et al. ..................... 364/300
5,249,293  9/1993  Schreiber et al. ................ 395/650
5,319,645  6/1994  Bassi et al. ..................... 364/944.6
5,457,797  10/1995  Butterworth et al. ............ 395/650

FOREIGN PATENT DOCUMENTS 6-187275  7/1994  Japan ..................... G06F 13/00

*Primary Examiner*—Robert W. Beausoliel, Jr.
*Assistant Examiner*—Joseph E. Palys
*Attorney, Agent, or Firm*—Staas & Halsey

[57]              ABSTRACT

An application and a debugger make a request for database manipulation to a database server via a pseudo-database server, so that the debugger is permitted to make access to a database within the same transaction as the application. When requested by the application to terminate a transaction, the pseudo-database server requests the database server to abort the transaction. According to settings in a debug environment file, the pseudo-database server logs messages transmitted and received by the application during the execution of a transaction.

8 Claims, 19 Drawing Sheets

```
dbsv-sim appl = NAME OF APPLICATION TO BE TESTED
         tran = SPECIFIES WHETHER TO COMMIT OR ABOUT TRANSACTION
         log  = SPECIFIES WHETHER TO LOG TEST DATA OR NOT
         rc   = (DATABASE MANIPULATION INSTRUCTION PSEUDO-DB SERVER
                SIMULATES RETURN VALUE PSEUDO-DB SERVER SIMULATES)
         ...
```

TERMINAL OPERATION
(FOR DEBUGGER)

```
(1) ndbx appl
    (DEBUGGER INITIATION)
(3) stop appl. kc : 200
    (BREAKPOINT SETTING)
(5) run
    (APPLICATION RUN)
(14) print (DATA DISPLAY)
     simrc (SIMULATION OF
            RETURN CODE)
```

31P
DEBUGGER PROCESS (2) PROCESS INITIATION (4) BREAKPOINT SETTING (6) PSEUDO - SERVER
    INITIATION (7) APPLICATION
    PROCESS CREATION

(15) DATA REFERENCE
     REQUEST

32P
APPLICATION PROCESS (8) APPLICATION RUN
    INITIATION (9) TRANSACTION
    INITIATION

(11) DATA UPDATE

(13) STOP AT
     BREAKPOINT
     ⋮
(17) TRANSACTION
     TERMINATION

33P
PSEUDO - DB
SERVER PROCESS

(10) TRANSACTION
     INITIATION

(12) DATA UPDATE

(16) DATA REFERENCE
     ⋮
(18) ROLLBACK

DB SERVER PROCESS

FIG. 8 simrc rc1 = RETURN VALUE TO SIMULATE    rc2 = RETURN VALUE TO SIMULATE

FIG. 9

DESTINATION DEFINITION FILE 80a

```
dbserver  "193, 431, 23, 45" : 102 : tcp
dbsv-sim  "193, 431, 23, 45" : 103 : tcp
dbsv-gw   "204, 321, 34, 56" : 100 : tcp
                                ↑
                                └─ GATEWAY SERVICE NAME AND
                                   PORT NUMBER (ADDRESS)
```

FIG. 14 ical problems with the facility (1). In this figure, application 1 is a client process, and DB server 2 is a server process that the DBMS activates in response to receipt of a transaction start instruction from application 1. Processes 1 and 2 communicate messages with each other by interprocess communications and performs transaction processing on database 3.

METHOD AND APPARATUS FOR TESTING AN APPLICATION IN A CLIENT/SERVER DATABASE SYSTEM USING PSEUDO-DATABASE SERVER AND DEBUGGER PROCESSES

BACKGROUND OF THE INVENTION

1. Field of the Invention

The present invention relates to a method of and a device for supporting tests performed on an application program which, as a client, performs transaction processing on a database via a database server.

2. Description of the Related Art

Client/server database system includes two processing forms: (1) a database management system (DBMS) directly accepts transactions from clients (application programs), and (2) a transaction processing monitor (TP monitor) intervenes between clients and the DBMS to accept transactions from the clients on a batch basis.

When the TP monitor is used, a client application and a server application must be created as an application program. When the TP monitor is not used, on the other hand, it is required to create only an application that describes instructions for transaction control and database manipulation.

In making a unit test of an application in the client/server system in which the TP monitor is not used, the DBMS actually needs to be used for the purpose of performing a syntax check on the description of the database manipulation instructions. In this case, however, since there is a possibility that the database may be destroyed by each unit application, an individual database for testing must be created for each application. That is, at the time of application unit test, a single database cannot be shared among a number of applications, failing efficient utilization of resources.

For the application test, not only a test at the time of normal processing but also a test for abnormal processing in the event of the occurrence of abnormality in a database will be needed. In such a case, an application must be rewritten in order to cause abnormality to occur deliberately. That is, the test for abnormal processing cannot be performed in an efficient manner.

A person who developed a database system may require to confirm the contents of the database which are modified by an application during transaction execution. However, the DBMS performs transaction control in such a way as to ensure the isolation or serializability of transactions; thus, other transactions are not permitted to see the intermediate results of a transaction. For this reason, for example, a debugger is not allowed to reference and update the contents of the database in the middle of application processing.

Here, the isolation or serializability of transactions in the DBMS will be described. In a database system, even when two or more applications cause simultaneous requests to update the database, data integrity must be ensured. For this reason, when two or more accesses are made simultaneously, the corresponding requests will be serviced in sequence. This is what is called transaction processing. A transaction is defined as a significant process for which the DBMS is requested by each application.

If, while an application is performing a data update process on a database, i.e., a transaction for updating a piece of data in the database, a different application attempts to reference that data in the database, it will refer to the intermediate results of that transaction, i.e., partially updated data. This may result in wrong results of a transaction by the different application. Therefore, exclusive control is used to prevent access to the database by other transactions than a transaction that is updating the database. Thereby, access to the database by each application will be made independently and serially. Thus, by executing transactions, which access the same database through the DBMS, independently and serially, the intermediate results of a transaction will be concealed from any other transaction.

In such a client/server system, the following facilities will be useful in debugging applications.

(1) When an application updates the contents of a database by transaction execution, it is restored to the state it had prior to the start of the transaction execution. This is performed without making any modification to the application.

(2) A return code from a database server for an database manipulation instruction issued by an application is altered without making any modification to the application.

(3) An operation of referencing and updating the contents of a database, which is being updated by an application, among transactions is performed without making any modification to the application.

Next, conventional problems encountered in implementing the above facilities (1), (2) and (3) will be described.

First, FIG. 1 is a diagram useful in explaining conventional problems with the facility (1). In this figure, application 1 is a client process, and DB server 2 is a server process that the DBMS activates in response to receipt of a transaction start instruction from application 1. Processes 1 and 2 communicate messages with each other by interprocess communications and performs transaction processing on database 3.

Upon receipt of a message that instructs the start of a transaction from application 1, DB server 2 maintains that transaction therein. Upon receipt of a database manipulation instruction from application 1, the DB server makes a structure analysis and a relational analysis of database 3 and then executes that instruction to reference and updates data in database 3. The DB server continues updating the contents of database 3 until it receives from application 1 a message describing the termination of that transaction. Upon receipt of that message, the DB server deletes the transaction in execution, whereby that transaction is terminated.

Thus, direct access to database 3 is made by DB server 2, i.e., the DBMS including the DB server. In order to restore the contents updated by the transaction to the state prior to the start of the transaction, therefore, application 1 or the DBMS must perform the restoration processing. In order not to modify application 1, therefore, it is required to incorporate a restoration facility into the DBMS. This requires a lot of work and is costly to develop.

FIG. 2 is a diagram useful in explaining conventional problems with the facility (2). Upon receipt of a database manipulation instruction from application 1, the DB server executes that instruction and then returns to application 1 a return code indicating the results of access made to database 3. At debug time, it is required to change the return code deliberately in order to test exceptional processing (e.g., error processing) within application 1. To this end, it is required to incorporate a facility for that purpose into part of application 1 only for debugging, which needs modifications to application 1.

FIG. 3 is a diagram for use in explanation of conventional problems with the facility (3).

This figure illustrates a case where terminal 4 initiates debugger 5 for debugging application 1. While application 1 is debugged, there are times when it is desired to make a reference to the contents updated by application 1 during transaction execution through debugger 5 or when it is desired to modify part of database 3 by debugger 5 during transaction execution. In this case, in order to ensure the logical consistency of the contents of database 3, it is required for debugger 5 to perform such a debug operation as described above by another transaction. This is because, when debugger 5 updates database 3 without declaring to the DBMS that a transaction is started, operations on database 3 may be executed in an order difficult to ensure the consistency of database 3. In such a case, application 1 would be terminated abnormally.

However, when debugger 5 attempts to perform the above debug operation by a transaction different from that of application 1, debugger 5 and application 1 will make access to the same resource on database 3; thus, the transaction of debugger 5 is placed in the exclusive wait state by DB server 2. Eventually it becomes impossible for debugger 5 to perform the above debug operation.

To perform the above debug operation, therefore, it is required to modify application 1 so as to incorporate a statement for that debug operation into application 1.

Thus, it is conventionally required to incorporate a debugging process into application 1 in order to test (debug) it. In order not to modify application 1, it is required to add some facility to the DBMS (in the case of the above facility (1)).

However, the way to incorporate a debug facility into application 1 cannot be said to be efficient because that facility must be incorporated into each application and this requires a lot of work. In addition, at the time of shipment of applications after their performance has been checked, work is also required to modify them again for the purpose of removing a facility incorporated for debugging purposes, resulting in reduced application development efficiency.

SUMMARY OF THE INVENTION

It is accordingly an object of the present invention to, in a client/server database system, enable a test of an application which performs various manipulations on the database via a database server as a client process to be made in an efficient manner with both the application and the database server installed normally without modifying part of the application for testing purposes.

To attain the object, a pseudo-database server process is installed which operates as a client process for a database server process and as a server process for an application process.

The application process requests the database server process to manipulate a database via the pseudo-database server process. The pseudo-database server process accepts manipulation requests from an application process and a debugger process, then requests the database server process to service these requests. As a result, only the pseudo-database server process is allowed to make a request to the database server process for database manipulation. A transaction processing request by the pseudo-database server process is serviced as a transaction by the database server process. Thus, even if each of the application process and the debugger process makes a database manipulation request separately, the database server process will service the requests by the two processes during the execution of a transaction requested by the pseudo-database server process.

Thereby, the debugger is allowed to reference the partially updated contents of the database by the application process.

By causing the database server process to perform rollback through the pseudo-database server process when the application process declares transaction termination, the contents of the database updated during the execution of a transaction can be restored to the state prior to the execution of that transaction. That is, since the updating of the database that an application process performs during the execution of its transaction is performed within a transaction provided to the pseudo-database server by the database server, the database updated through the pseudo-database server process while a test of the application process is being made can be restored to the same state as before the test. Thus, a database, which is shared among a number of applications, can efficiently be used for the unit test of these application processes. In addition, in the event that a failure occurs in an application while a system is operating, it may be debugged on the system.

By incorporating into the pseudo-database server process a facility of changing a return value from the database server process and passing the changed return value to the application process, a test for abnormality of the application process can be made efficiently without incorporating a routine for that test into the application process.

In a system as well in which a machine where an application process is installed and a machine where a database and a database server machine are installed communicate messages for database manipulation with each other via a communications line such as a network, if it is configured such that the application process and the database server access the database server process via a pseudo-database server, such an operation as described above can be performed.

BRIEF DESCRIPTION OF THE DRAWINGS

FIG. 6 shows the exemplary contents of the debug environment file of FIG. 5;

FIG. 8 is a diagram for use in explanation of the entire flow of debugging of an application in the first embodiment;

FIG. 9 shows an example of an input format of the simrc command in the debugger of FIG. 5;

FIG. 14 shows the contents of the destination definition file on the client machine side of FIG. 13.

DETAILED DESCRIPTION OF THE PREFERRED EMBODIMENTS

Figure 1:
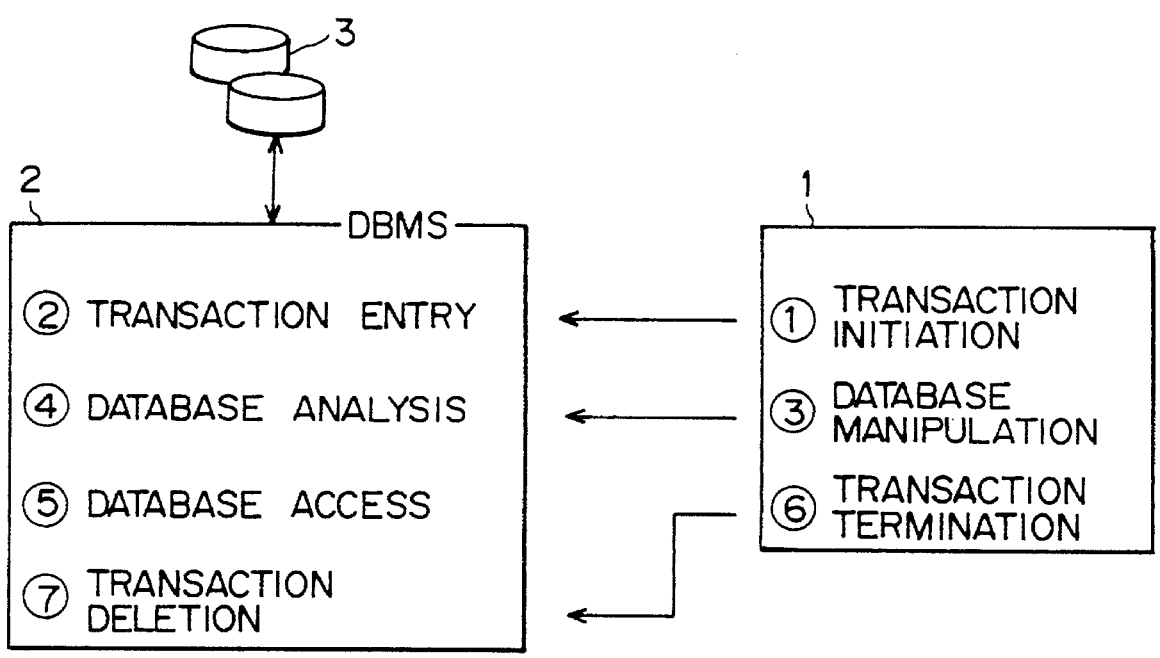
FIG. 1 is a diagram for use in explanation of problems with a conventional application testing method.
Figure 2:
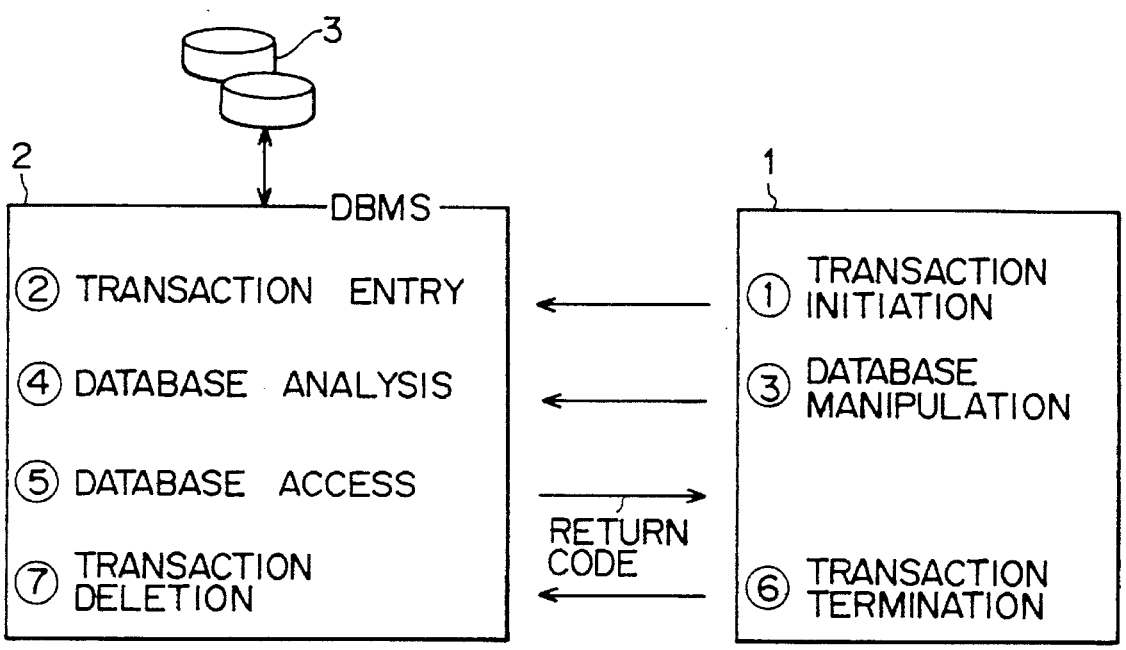
FIG. 2 is a diagram for use in explanation of problems with another conventional application testing method.
Figure 3:
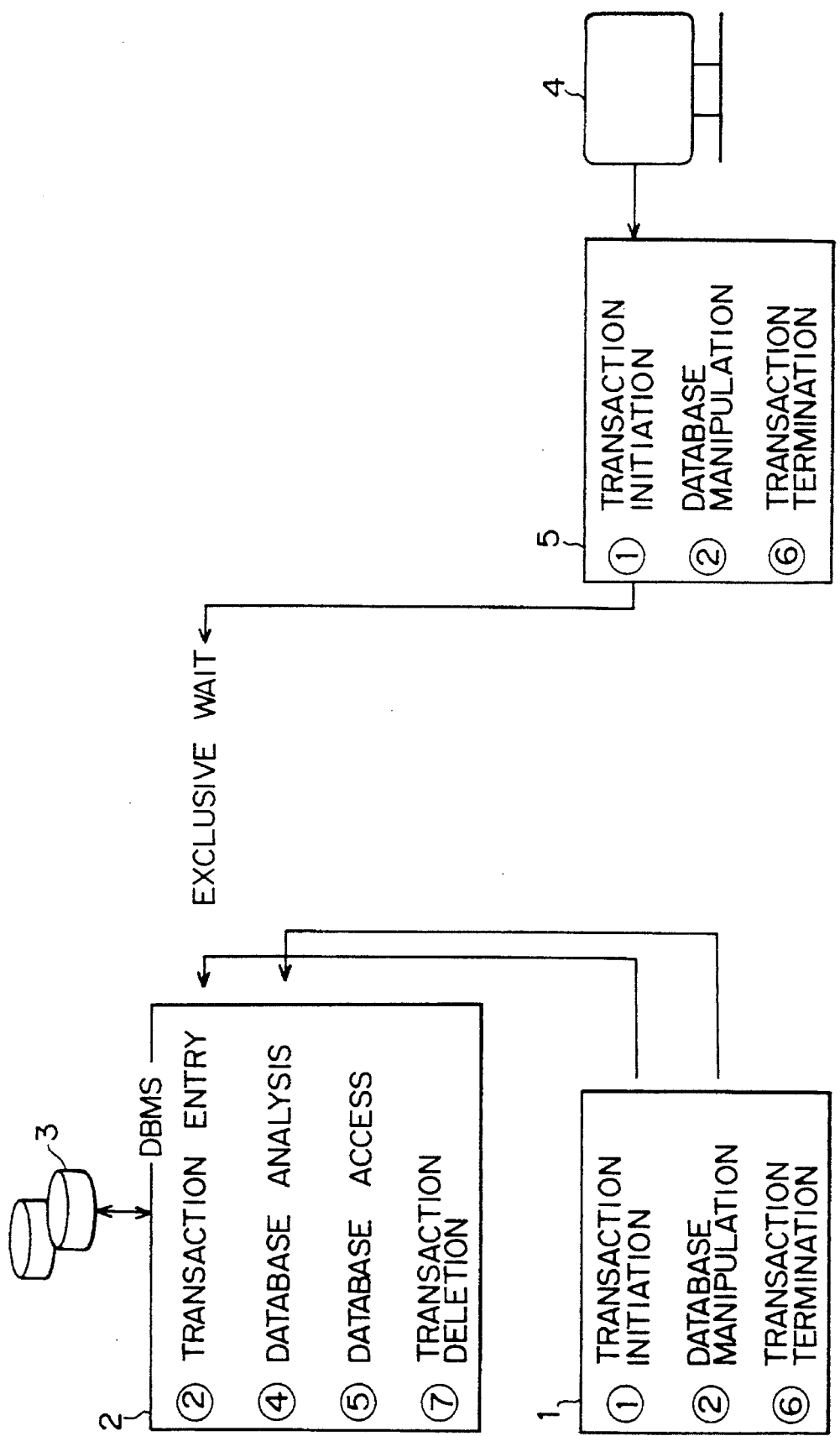
FIG. 3 is a diagram for use in explanation of problems with still another conventional application testing method.
Figure 4:
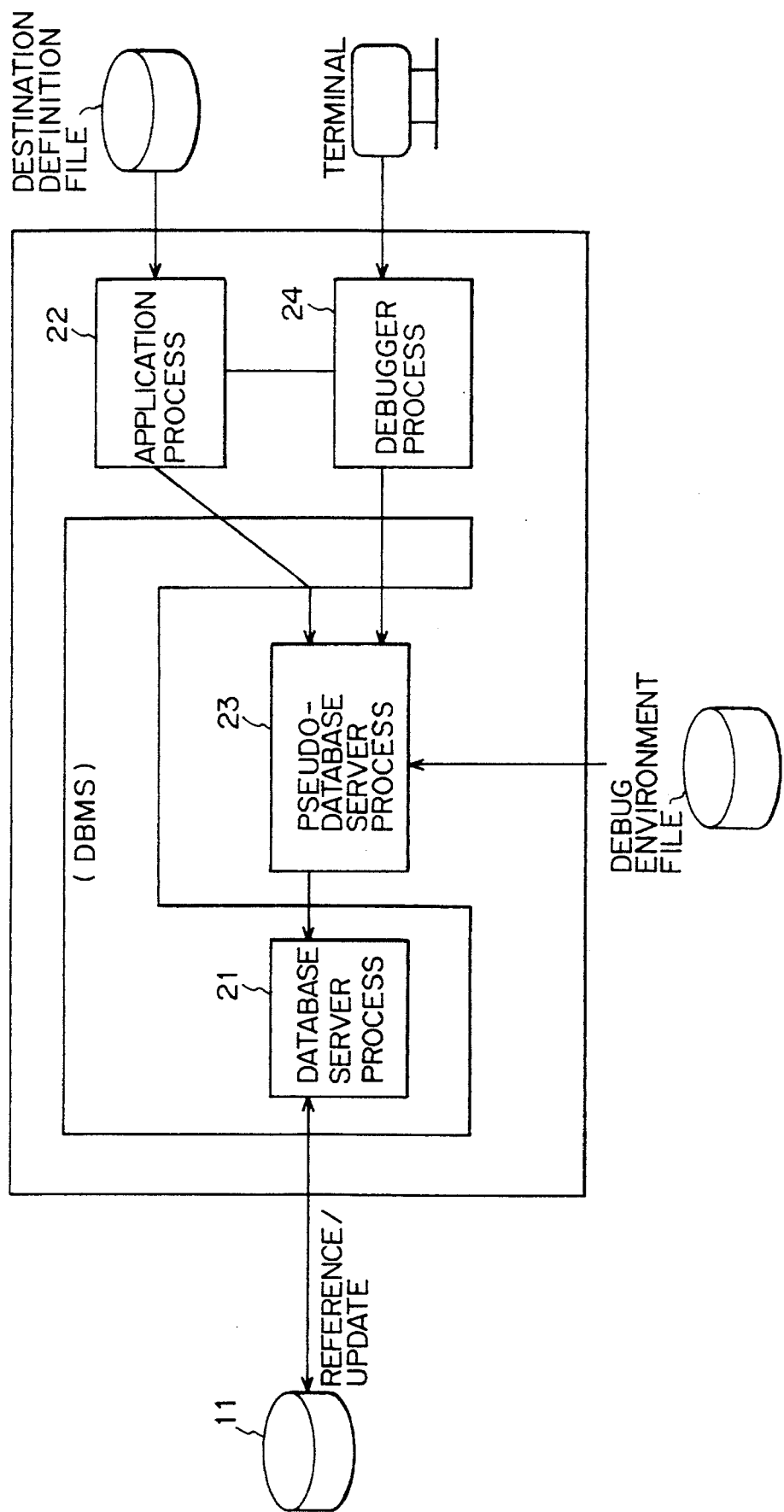
FIG. 4 is a diagram for use in explanation of the principle of the present invention.

FIG. 4 is a diagram for use in explanation of the principle of an application testing method of the present invention.

The present invention is directed to a method which, in a client/server database system, makes a test of an application that serves as a client process for a database server process 21 dedicated to managing a database 11 and makes manipulation requests associated with the database to the database server process.

A pseudo-database server process 23 is provided which serves as a server process for a process 22 of the application and as a client process for the database server process 21. The pseudo-database server process 23 passes a database management request by the application process 22 to the database server process 21 and, upon receipt of a transaction termination request from the application process 22, requests the database server process 21 to abort the transaction.

The above configuration may be modified such that a file is provided which specifies whether a transaction by the application process 22 is to be aborted or committed and, when that transaction is specified to be aborted in the file, the pseudo-database server process 23 requests the database server process 21 to abort the transaction.

Further, the pseudo-database server process 23 passes a database processing request by the application process 22 to the database server process 21 and, if, when receiving a response message from the database server process 21, a modification to return information for the manipulation request is specified beforehand, modifies the return information in the response message as specified and transmits it to the application process 22.

In such a configuration, there may be provided a file which defines modification information for some manipulation requests which need modifications to return information therefor among manipulation requests issued by the application program 22. In this case, the pseudo-database server process 23 is permitted to reference that file and modify the return information.

Moreover, there may be provided a process which requests the pseudo-database server process 23 to modify return information for a manipulation request by the application program 22. Thus, the pseudo-database server process 23 modifies the return information as requested by that process.

In this case, the modification requesting process may request the pseudo-database server process 23 to modify the return information as specified by a command entered through a terminal.

A debugger process 24 is further provided which serves as a client process for the pseudo-database server process 23 and sets a breakpoint in the application process 22. When the application process 22 is stopped at the breakpoint, the debugger process 24 requests the pseudo-database server process 23 to reference or update the database 11. In response to this request, the pseudo-database server process 23 transmits a manipulation request to the database server process 21, then receives a response from the database server process and transmits it to the debugger process 24.

In this case, the debugger process 24 can set a breakpoint of the application process 22 and make a database reference/update request as specified by a command entered through a terminal.

The application process 22 may acquire, from operating-system-prepared environment variables, destination information for interprocess communications with the pseudo-database server process 23 on which a manipulation request for the database 11 is made.

In this case, the debugger process 24 may generate the application process 22 after setting the destination information of the pseudo-database server process 23 in the environment variables.

In addition to the destination information, a protocol used for interprocess communications may be set in the environment variables. In this case, the application process 22 can acquire protocol information as well as destination information from the environment variables.

The pseudo-database server process 23, which acts as a server process for the application process 22 and as a client process for the database server process 21 and transmits a database manipulation request by the application process 22 to the database server process 21 and then returns a response for the manipulation request from the database server process 21 to the application process 22, logs a manipulation request for the database server process 21 made by the application process 22 and a response from the database server process 21 for the processing request in a given storage device.

In this case, a file may be provided which specifies whether a log of a transaction by the application process 22 is to be kept or not. The pseudo-database server process 23 logs the transaction when logging is specified in that file.

The database 11, the database server process 21 and the pseudo-database server process 23 are installed on the server machine side, while the application process 22 is installed on the client machine side connected to the server machine through a network. A communications facility is further provided which permits message communications between the application process 22 and the pseudo-database server process 23 via the network.

In another aspect of the present invention, the database 11, the database server process 21 and the pseudo-database server process 23 are installed on the server machine side, while the application process 22 and the debugger process 24 are installed on the client machine side connected to the server machine side through a network. A communications facility is further provided which permits the application process 22 or the debugger process 24 to communicate with the pseudo-database server process 23 via the network.

On the other hand, an application test supporting device of the present invention is a device which, in a client/serve database system, acts as a client for a database server dedicated to managing a database and supports a test of an application which makes a request associated with the database to the database server.

A pseudo-database server is provided which acts as a server for the application and as a client for the database server. The pseudo-database server entrusts the database server with a database manipulation request by the application, returns a response of the database server to that request to the application, and, upon receipt of a transaction termination request by the application, requests the database server to abort the transaction.

According to another aspect of the present invention, a test support device is provided with a pseudo-database server which acts as a server for an application and as a client for a database server. This pseudo-database server entrusts the database server with a database manipulation request made by the application, and if, when receiving a response message to that request from the database server, a modification to return information for the request has been specified beforehand, modifies the return information in the response message as it is specified, then transmits it to the application.

According to still another aspect of the present invention, a test support device is provided with a pseudo-database server which acts as a server for an application and as a client for a database server and a debugger which acts as a client for the pseudo-database server and sets a breakpoint in the application. When the application is stopped at a breakpoint, the debugger requests the pseudo-database server to reference or update a database. In response to this, the pseudo-database server sends a manipulation request corresponding to the reference or update request by the debugger to the database server, then sends the results of a response to the processing request from the database server to the debugger.

According to a further aspect of the present invention, a test support device is provided with a pseudo-database server which acts as a server for an application and as a client for a database server, sends a database manipulation request by an application to the database server, and sends the results of a response to the manipulation request from the database server to the application. The pseudo-database server logs the database manipulation request by the application and the results of a response from the database server in a given storage device.

The database, database server and the pseudo-database server are installed on the server machine side and the application is installed on the client machine side connected to the server machine through a network. A communications facility is provided which permits message communications between the application and the pseudo-database server via the network.

The database, the database server and the pseudo-database server are installed on the server machine side, and the application and the debugger are installed on the client machine side connected to the server machine through a network. A communications facility is provided which permits message communications between the application (or the debugger) and the pseudo-database server via the network.

In the method of the present invention, pseudo-database server process 23 is created and initiated to act as server process for application process 22 and as client process for database server process 21.

Application process 22 entrusts its database reference or update request to pseudo-database server process 23. Then, pseudo-database server process 23 entrusts that request to database server process 21. Upon receipt of a response to the request from database server process 21, pseudo-database server process 23 returns it to application process 22.

Thus, application process 22 is permitted to reference or update database 11 via pseudo-database server process 23.

Upon receipt of a transaction termination request from application process 22, pseudo-database server process 23 sends an abort instruction to database server process 21.

Even if database 11 is used for the purpose of testing an application, therefore, after the termination of a test it can be restored to the state it had before the test. Database 11 can therefore be shared among a plurality of applications for their testing purposes.

Upon receipt from application process 22 of a database reference or update instruction in which a modification to return information is specified beforehand, pseudo-database server process 23 sends it to database server process 21 and then modifies return information included in a response message from database server process 21 to a specified value. Pseudo-database server process 23 returns the modified information to application process 22.

Thus, this permits a process for abnormal return within the application to be debugged easily and efficiently.

Further, application-debugging process 24 is created and initiated, which is caused to act as a client process for pseudo-database server process 23. Upon receipt of a database access command from debugger process 24, pseudo-database server process 23 interprets it, converts it to conform to the application programming interface (API) of database server process 21, then sends it to database server process 21. Upon receipt of the results of the execution of that command from database server process 21, pseudo-database server process 23 sends them to debugger process 24.

In this case as well, as with application process 22, pseudo-database server process 23 serves as a client process for database server process 21. Thus, database server process 21 services a database manipulation request issued by debugger process 24 within a transaction initiated by application process 22.

When receiving an application-process-breakpoint setting command from the terminal, debugger process 24 sets a breakpoint in application process 22.

Consequently, a person in charge of testing an application or a person who developed the DBMS is allowed through terminal operation to stop the execution of application process 22 at a desired point during a transaction and to make a reference to the contents of database 11 updated by application process 22 until the process execution is stopped. The above person is also allowed to update database 11. In the event that no correct database processing is performed, therefore, it becomes easy to investigate which of the application and the DBMS caused the malfunction, increasing debugging efficiency.

Pseudo-database server process 23 logs a database manipulation command from application process 22 and a response message from database server process 21 for the execution of that command in a given storage device while a transaction is processed.

The log is output to outside after the termination of an application test; thus, the operation of the application can be examined on the basis of the contents of the log.

The above application test can also be made in the same manner in a database system in which an application, DBMS and database are each installed on respective individual machines connected by a network other than a client/server database system in which the application, the DBMS and the database are installed on the same machine, by taking advantage of on-network interprocess communications supported by the communications facility.

In the device of the present invention, the database server, the application, the pseudo-database server, and the debugger function identically to database server process 21, application process 22, pseudo-database server process 23, and debugger process 24, respectively, providing the same advantages as the above method.

Figure 5:
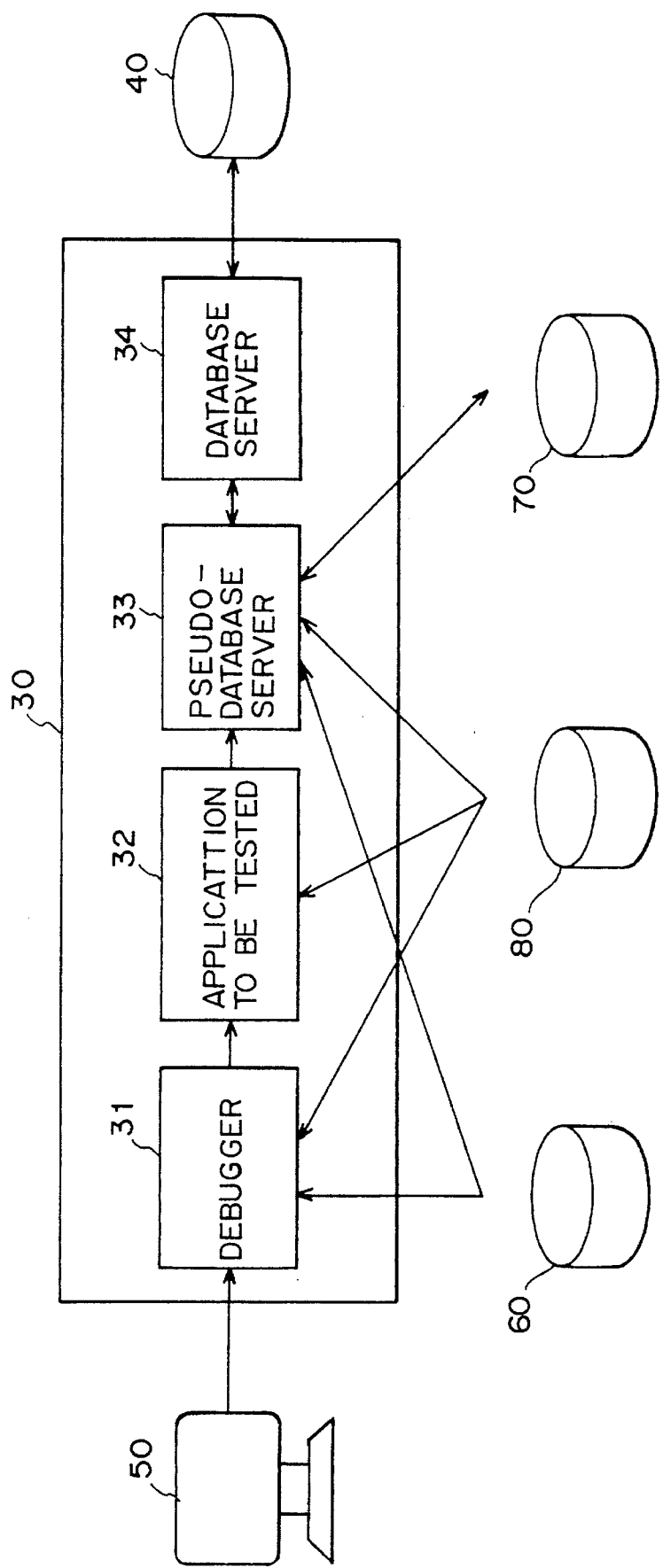
FIG. 5 shows a system configuration according to a first embodiment of the present invention.

Referring now to FIG. 5, there is illustrated a client/server database system according to a first embodiment of the present invention, in which an application 32, which acts as a client process that requests a database server 34 to execute a transaction, and the database server 34 are installed on the same server machine.

The server machine 30 is, for example, a work station to which is connected a terminal 50 through which an operator is allowed to initiate a debugger 31 to test the application 32 which is a candidate for testing.

The debugger 31 retrieves debug environment information from a debug environment file 60 to create a process of the application 32. And besides, the debugger 31 accepts an operator debug command from the terminal 50, interprets it, creates a process of a pseudo-database server 33, and requests the pseudo-database server 33 for various debug operations.

The pseudo-database server 33 reads from a destination definition file 80 the service name of the database server 34, destination information for interprocess communications, and a communications procedure (communications protocol) for interprocess communications with the database server 34 and establishes connections with the database server 34 and the application 32. Upon receipt of a message describing a request for transaction initiation from the application 32, the pseudo-database server 33 sends the transaction initiation requesting message to the database server 34. After that, at every receipt of a message describing a database manipulation request from the application 32, the pseudo-database server retrieves a database manipulation command and sends it to the database server 34. If a logging command is present in debug information in the debug environment file 60 or a message sent from the debugger 31, then the pseudo-database server 33 logs a database manipulation requesting message to be sent to the database server 34 in a test result log file 70. A response message from the database server to that message is also logged in the log file 70. Moreover, if debug environmental information specifying a transaction abort has been set in the debug environment file 60, the pseudo-database server changes a transaction termination request from the application 32 to a rollback request and sends it to the database server 34. Furthermore, if debug environmental information in the debug environment file 60 or a debug command from the debugger 31 specifies that return code (return information) from the database server 34, which represents the results of the execution of a database manipulation instruction issued by the application 32, is to be changed to a specified value, the pseudo-database server changes that return code to the specified value and then sends it to the application 32.

Thus, the pseudo-database server 33 intervenes between the application 32 or the debugger 34 and the database server 34 and acts as a client for the database server. That is, accesses by the application 32 and the debugger 31 to the database server 34 are made via the pseudo-database server 33. Consequently, the database server 34 performs transaction management as accepting database manipulation requests from one client, or the pseudo-database server, though, in practice, it accepts the requests from two clients, or the application and the debugger.

Thus, the application 32 and the debugger 31 are permitted to access the same database 40 within the same transaction. By controlling the execution by the application 32 within that transaction, the debugger 31 is permitted to reference the contents of the database 40 which have been updated by the application or update the database by itself. This is a feature of the present embodiment.

The database server (database management system; DBMS) 34 interprets and executes a database manipulation instruction, described in a database manipulating language, such as a structured query language (SQL), from the pseudo-database server 33, then references and updates the database 40 as told by the instruction. The database server presents the results to the pseudo-database server 33 in the form of a response message.

FIG. 6 shows the contents of the debug environment file 60, which stores debug information specifying a debug environment, debug operating conditions, etc.

The description "dvsv-sim" on the first line is the service name of the pseudo-database server 33. On the right of "appl= . . . " on the same line is described the name of an application to be tested, i.e., the name of the application 32 in the present embodiment.

On the right of the description "trans= . . . " is specified whether a transaction of the application 32 is caused to commit or abort. Note here that "commit" refers to actual updating of the database 40 by actually carrying out an updated log which has been stored in a memory not shown. On the other hand, "abort" refers to performing no actual updating of the database 40 by making the updated log invalid. When the transaction is caused to abort, therefore, the contents of the database 40 is preserved in the state prior to the transaction initiation.

On the right of the subsequent description "log= . . . " is specified whether test data, that is, a response (the results of processing) to a database manipulation instruction issued by the application 32 and an arithmetic instruction from the database server 34, etc., is logged or not.

Finally, in the description "rc=( . . . , . . . )", the pseudo-database server 33 specifies a changed value (simulation value) for return information from the database server 33 for the execution of a database manipulation instruction issued by the application 32.

As an example, if the database 40 is an object-oriented database, the above database manipulation instruction is a function provided by the database server (DBMS) 34 as an API (application programming interface). In this case, the return information will be a function value. If, on the other hand, the database 40 is a relational database, the database manipulation instruction will be described by an SQL statement by way of example.

Figure 7:
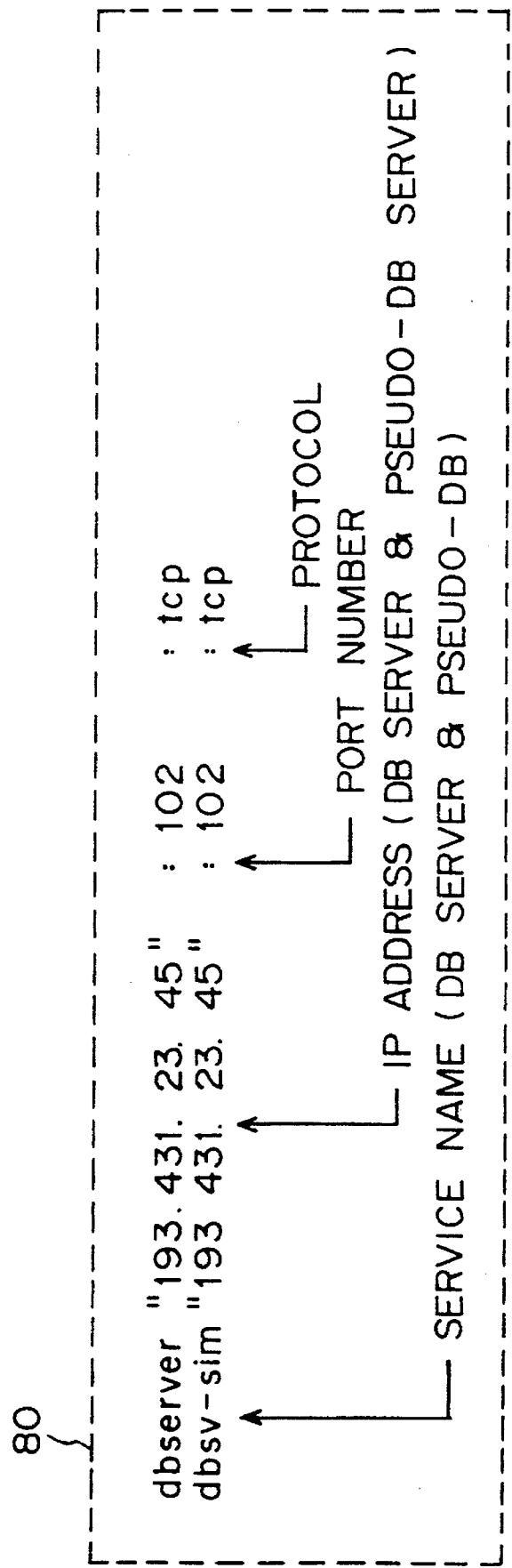
FIG. 7 shows the exemplary contents of the destination definition file of FIG. 5.

FIG. 7 shows the exemplary contents of the destination definition file 80.

In this figure, the description, dserver "193.431.23.45":102:tcp, specifies that the service name of the database server 34 is "dserver", and interprocess communications are made with the database server 34 by TLI (Transport Layer Interface) or socket-based TCP/IP protocol by the use of "193.431.23.45" as the IP address and "102" as the port number (address).

On the other hand, the description, dserver "193.431.23.45":103:tcp, specifies that the service name of the pseudo-database server 33 is "dbsv-sim", and interprocess communications are made with the pseudo-database server 33 by the TLI or socket-based TCP/IP protocol by the use of "193.431.23.45" as the IP address and "103" as the port number (address).

Namely, in this example, the IP address and the port number are used as destination information required for interprocess communications.

The pseudo-database server 33 references the destination definition file 80 and establishes a connection with the database server 34. The debugger 31 references the destination definition file 80 and establishes a connection with the pseudo-database server 33. The application 32 references the destination definition file 80 and establishes a connection with the pseudo-database server 33.

The test-result log file 70 is a file in which a database manipulation instruction issued by the application 32 to the pseudo-database server 33 and a response from the database server 34 to that instruction are logged. This logging process is performed by the pseudo-database server 32. The test results logged in the file 70 is displayed on a monitor of the terminal in real time or dumped to a printer not shown.

FIG. 8 shows the overall flow of the way in which the application 32 is debugged in the present embodiment.

In this figure, a debugger process 31P, application process 32P, pseudo-database server process 33P, and database server process 34P indicate execute forms of the respective programs of the debugger 31, application 32, pseudo-database server 33, and database server 34 on the server machine 30.

To start debugging the application 32, the operator enters a command into the debugger 31 from the terminal 50.

First, the operator enters a debugger initiating command (ndbx appl) from the terminal 50 (step 1 of FIG. 8). Thereby, the debugger process 31P (ndbx process) is created and initiated (step 2).

The operator subsequently enters a breakpoint setting command (stop appl.kc:200) from the terminal 50 (step 3). Thereby, the debugger process 31P sets a specified breakpoint in the application process 32P (step 4). It should be noted that one or more breakpoint may be set.

Next, the operator enters a command to run the application 32 (step 5). Upon receipt of this command, the debugger process 31P references the debug environment file 60 to thereby create the pseudo-database server process 33P (step 6) first and create the application process 32P (step 7) next after setting the address (port number) of the pseudo-database server process in a given environment value.

Thereby, the application process 32P is initiated (step 8), so that the address of the pseudo-database server 33P is fetched from the environment variables and a connection with the pseudo-database server process 33P is set up for interprocess communications. Then, the application process 32P sends a message declaring the transaction initiation to the pseudo-database server process 33P (step 9). The pseudo-database server process 33P receives that message, whereupon it is sent to the database server 34P (step 10). Note that, when created, the pseudo-database server process 33P references the destination definition file 80 and establishes a connection with the database server process 34P for interprocess communications.

After that, the application process 32P sends a database-updating instruction to the pseudo-database server process 33P by a message (step 11). The pseudo-database server process 33P then sends the database updating instruction to the database server process 34P by a message (step 12). The database server process 34P interprets and executes that instruction, then updates the database 40. Though not shown, the database server process 34P returns the results of this updating (normally terminated or abnormally terminated, etc.) to the pseudo-database server process 33P. The pseudo-database server process 33P sends the response from the database server process 34P to the application process 32P as return information. When logging is specified in the debug environment file 60, the pseudo-database server process 33P stores a log about updating of the database 40 (the database updating instruction from the application process 32P and the response from the database server process 34P for the execution of that instruction) in the test-result log file 70.

Though not shown, the application program 32P continues to transmit the database manipulation instruction to the pseudo-database server process 33P until it stops at a breakpoint (step 13). With each transmission of that instruction, the above operations are repeated. For the database manipulation instruction specified in the form of "rc=( , )" in the debug environment file 60, the pseudo-database server process 33P changes a response received from the database server process 34P to a return value specified by the description "rc=( , )" and returns the result to the application process 32P.

When the application process 32P stops at a breakpoint, it is displayed on the monitor of the terminal 50 and the operator is allowed to enter the next debug command from the terminal 50. At this point, the operator enters a command (print . . . ) to display some data in the database 40 (step 14). Upon receipt of the data display command (print), the debugger process 31P requests the pseudo-database server process 33P to refer to the specified data (step 15).

Upon receipt of the request, the pseudo-database server process 33P changes this to a format understandable by the database server process 34P, then sends it to the database server process 34P (step 16). Though not shown, the database server process 34P reads the specified data from the database 40, then sends it to the pseudo-database server process 33P. This data is transferred from the database server process 33P to the debugger process 31P, so that the referenced data is displayed on the monitor of the terminal 50. When logging is specified in the debug environment file 60, a log of data reference is also kept in the test-result log file 70 by the pseudo-database server process 33P.

Note that the simulation in which the pseudo-database server process 33P changes a return value from the database server process 34P for a database manipulation instruction issued by the application process 32P to a different value and returns the result to the application process 32P can also specified by entering a debug command ("simrc") from the terminal 50.

FIG. 9 shows an example of an input format of that debug command. In this figure, "simrc" is a command name, and "rc1" and "rc2" are label names for which return values are set. The return values A and B to be simulated are specified in the form that rc1=A and rc2=B. The number of return values to be specified is not restricted to two. It may be only one or more than two.

The "simrc" command may specify a change of the return value to stop. If this is done, then the return value simulation will no longer be performed.

Other debug commands than the above command that the operator is allowed to enter from the terminal 50 are "next", "set", "quit", etc.

The "next" command is a command that executes a database manipulation instruction described on the next line following a breakpoint. The entry of the "simrc" command is usually made before the "next" command is entered. Thereby, the return code from the database server process 34P based on the execution of the database manipulation instruction described on the next line following a breakpoint is changed to a return code specified by the "simrc" command, then returned to the application process 32P. The "simrc" command has precedence over the functionally equivalent description "rc=( , )" set in the debug environment file 60.

The "set" command directs that a record in the database 40 be updated. The "quit" command directs that the debugger process 31P be terminated.

After various database manipulation instructions were issued by the application process 32P and hence the database 40 was referenced and updated in the above manner, the application process 32P requests the pseudo-database server process 33P to terminate the transaction (step 17). The pseudo-database server process 33P then requests the database server process 34P for rollback when the transaction is specified to be aborted in the debug environment file 60. Thus, database server process 34P restores the contents of the database 40 to the state prior to the transaction initiation.

Thus, even if, when an abort of a transaction is specified in the debug environment file 60, the database 40 is updated for debugging the application 32, it can be restored to the state it was prior to initiation of the debug at the termination of the debug. This eliminates the need for considering the possibility that the database 40 may be destroyed by other applications being tested. Thus, the database 40 can be shared among two or more applications for testing purposes.

Moreover, since the pseudo-database server process 33P is permitted to change a return code for a database manipulation instruction issued by the application process 32P to a desired value and return it to the application process, a processing test in the event of the occurrence of abnormality in the database 40 and the DBMS (database server process 34P) can be made easily on the application side without modifying part of the application 32 for debugging purposes.

Furthermore, the debugging engineer can use the debugger 31 with terminal operation to confirm the contents of the database 40 updated by the application process 32P during the execution of a transaction. Data that the application process 32P will reference and update while a transaction is being executed can also be set to a desired value prior to referencing and updating by the application process 32P. This permits the application 32 to be debugged in an efficient manner. In addition, the DBMS (database server) developer can also confirm the results of processing (the results of updating of the database) by the database server process 34P for a request by the application process 32P during the execution of a transaction, permitting the DBMS to be debugged in an efficient manner. Even if the database server process 34P has updated data in the database 40 erroneously, the updated data can be revised correctly during the execution of a transaction, permitting continued execution of the subsequent debugging. Thus, the database system can be debugged with increased efficiency.

Figure 10A:
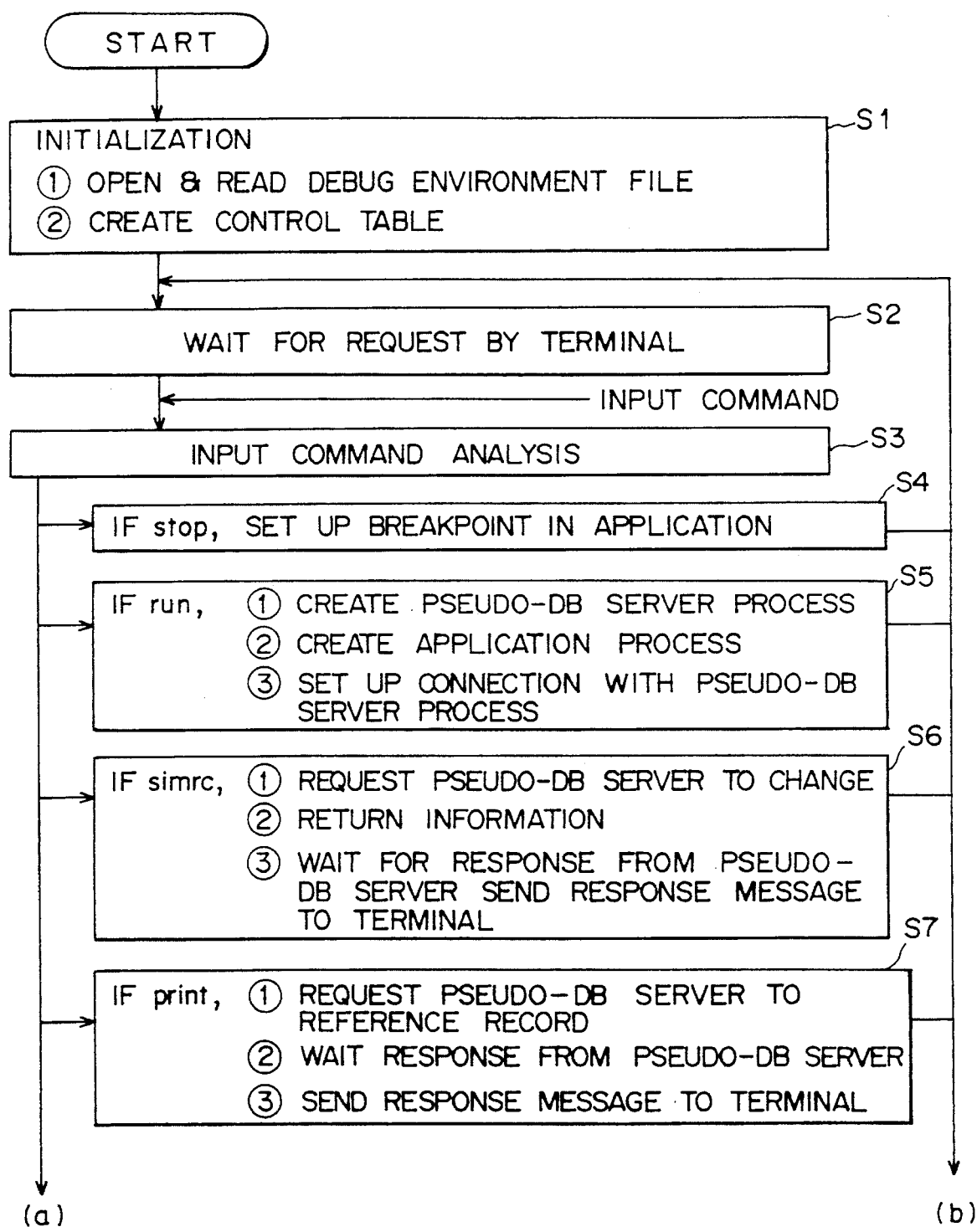
FIGS. 10A and 10B are a flowchart for a debugger process.
Figure 10B:
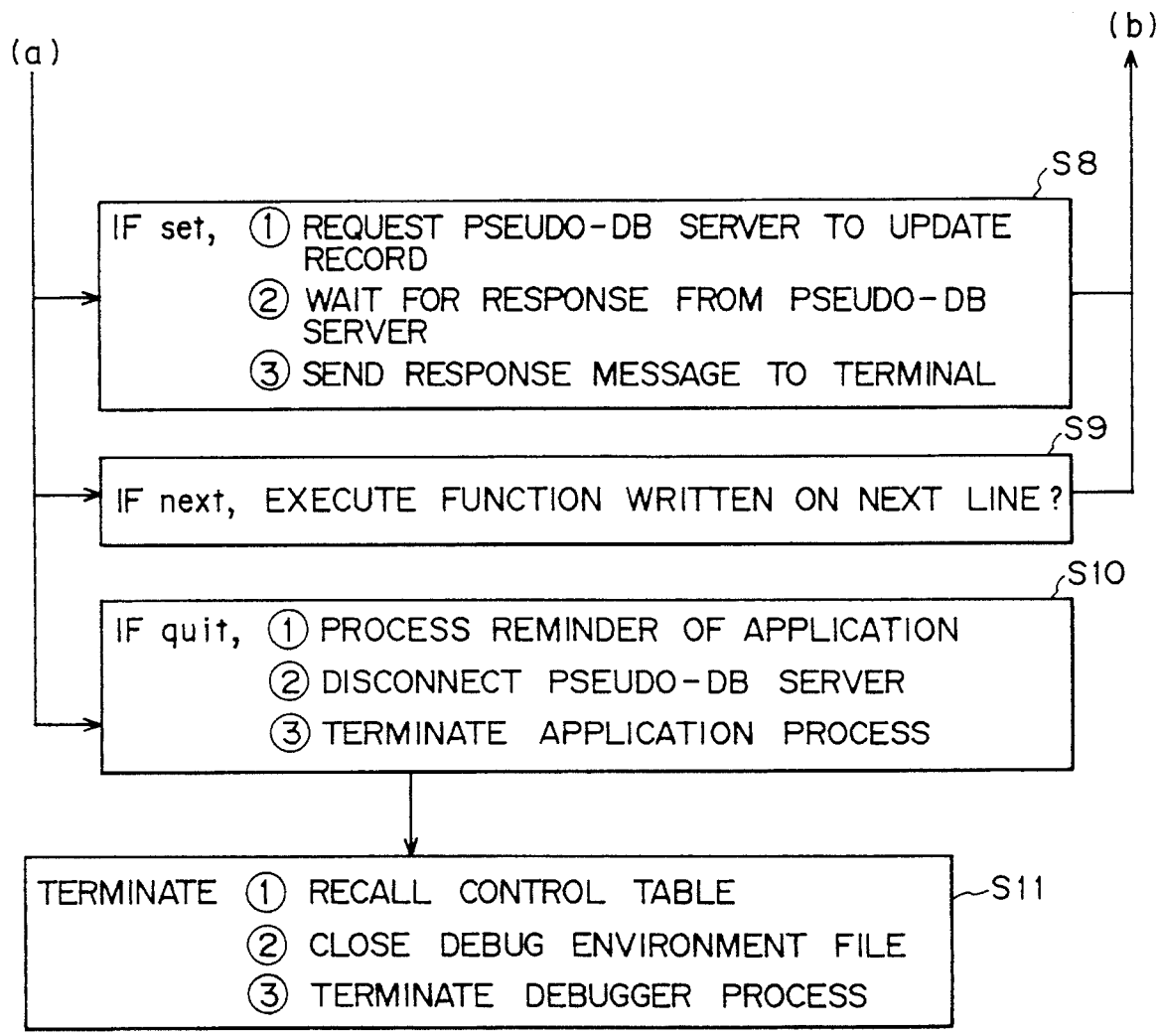

Next, the operation of the debugger process 31P that implements the above-described debugging will be described with reference to FIGS. 10A and 10B.

When initiated, the debugger process 31P first performs initialization. That is, the debugger process first opens the debug environment file 60 to read its contents and then develops operating environment information specified by the contents in a control table created on main storage not shown (S1).

The debugger process 31P is placed in the wait state until a command is entered from the terminal 50 (S2). Upon receipt of a command entered from the terminal 50, the debugger process interprets and executes it (S3).

When that command is a stop command, the debugger process sets a breakpoint at that address in the application process 32P which is specified by the command (S4). With a run command, on the other hand, the debugger process performs the following processes (S5):

(1) It references the control table to obtain the service name "ndsv-sim" of the pseudo-database server 33 and then causes a shell to execute the service name as a command to thereby create and initiate the pseudo-database server process 33P.

(2) It next references the destination definition table 80, obtains the port number of the pseudo-database server process 33P from that table, then sets that port number to a given environment variable. And then, it references the control table to create the application process 32P.

(3) It references the destination definition table 80 to obtain the port number of the pseudo-database server process 33P. Using this port number, it sets up a connection with the pseudo-database server process 33P by means of the TLI-based TCP protocol.

With a "simrc" command, on the other hand, the debugger process perform the following processes (S6):

(1) It requests the pseudo-database server process 33P to change the return code (return information) to a value specified by the sirmc command.

(2) It waits for a response from the pseudo-database server process 33P.

(3) Upon receipt of the response, it sends the response message to the terminal 50 for display on its monitor screen.

With a print command, it requests the pseudo-database server process 33P to reference a record in the database 40 that is specified by that command, then performs the same processes as the processes (2) and (3) for the simrc command (S7).

With the set command, the debugger process requests the pseudo-database server process 33P to update a record in the database 40 that is specified by that command, then performs the same processes as the processes (2) and (3) for the simrc command (S8).

Thus, in steps S6, S7 and S8, the debugger process waits for a response from the pseudo-database server process 33P after it has made a request on that process. Upon receipt of a response message, the debugger process display its contents on the terminal monitor. With the print command, therefore, the contents of a specified record in the database are displayed. That is, the person in charge of testing is allowed to confirm the contents of a record updated by the application process 32P during the execution of a transaction. With the set command, a specified record in the database is updated during the execution of a transaction. Thus, the person in charge of testing is allowed to set any record in the database 40 to desired data during the execution of a transaction.

With the next command, the debugger process permits the application process 32P to execute up to the next line (S9).

At the termination of the interpretation and execution of such an input command, the procedure returns to step S2 in which the debugger process waits for the entry of a command from the terminal 50.

Upon receipt of the quit command, the debugger process 31P performs the following processes (S10):

(1) It causes the application process 32P to execute the remaining processes.

(2) It disconnects the connection with the pseudo-database server process 33P.

(3) It terminates the application process 32P.

Subsequent to step S10, the debugger process performs the following termination processes (S11):

(1) It recalls the control table.

(2) It closes the debug environment file 60.

(3) It terminates itself.

Figure 11A:
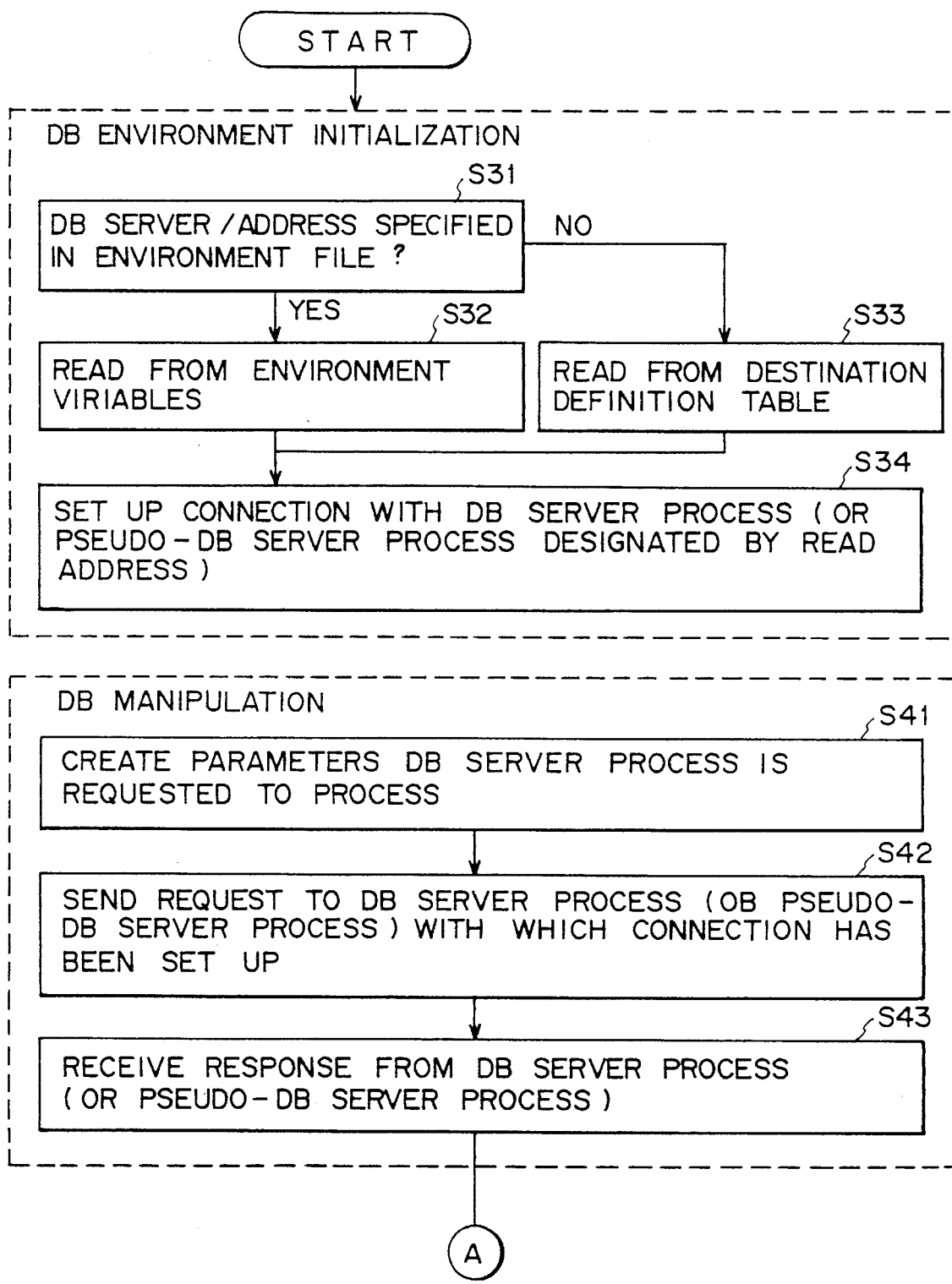
FIGS. 11A and 11B are a flowchart for an application process.
Figure 11B:
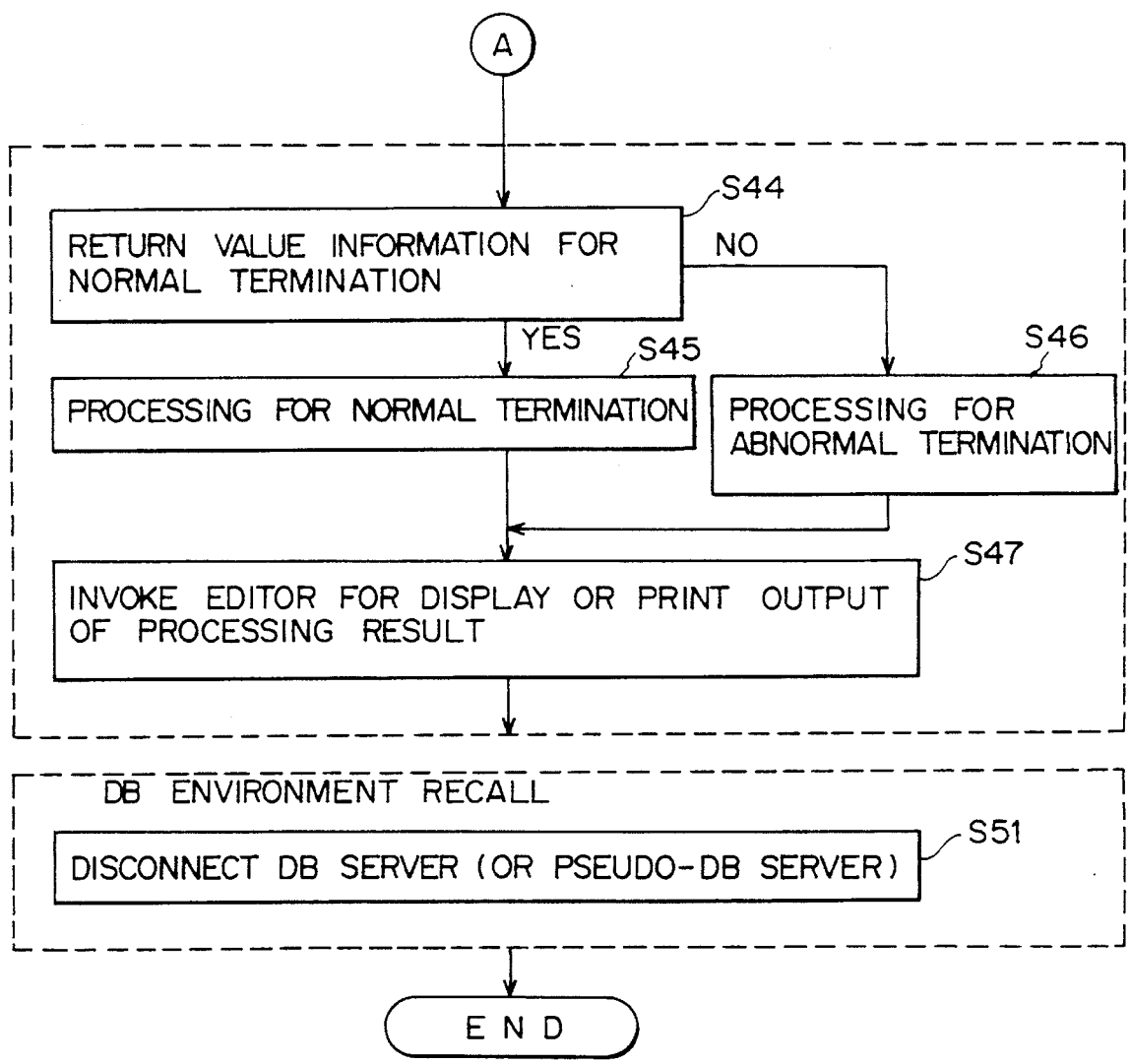
Figure 12A:
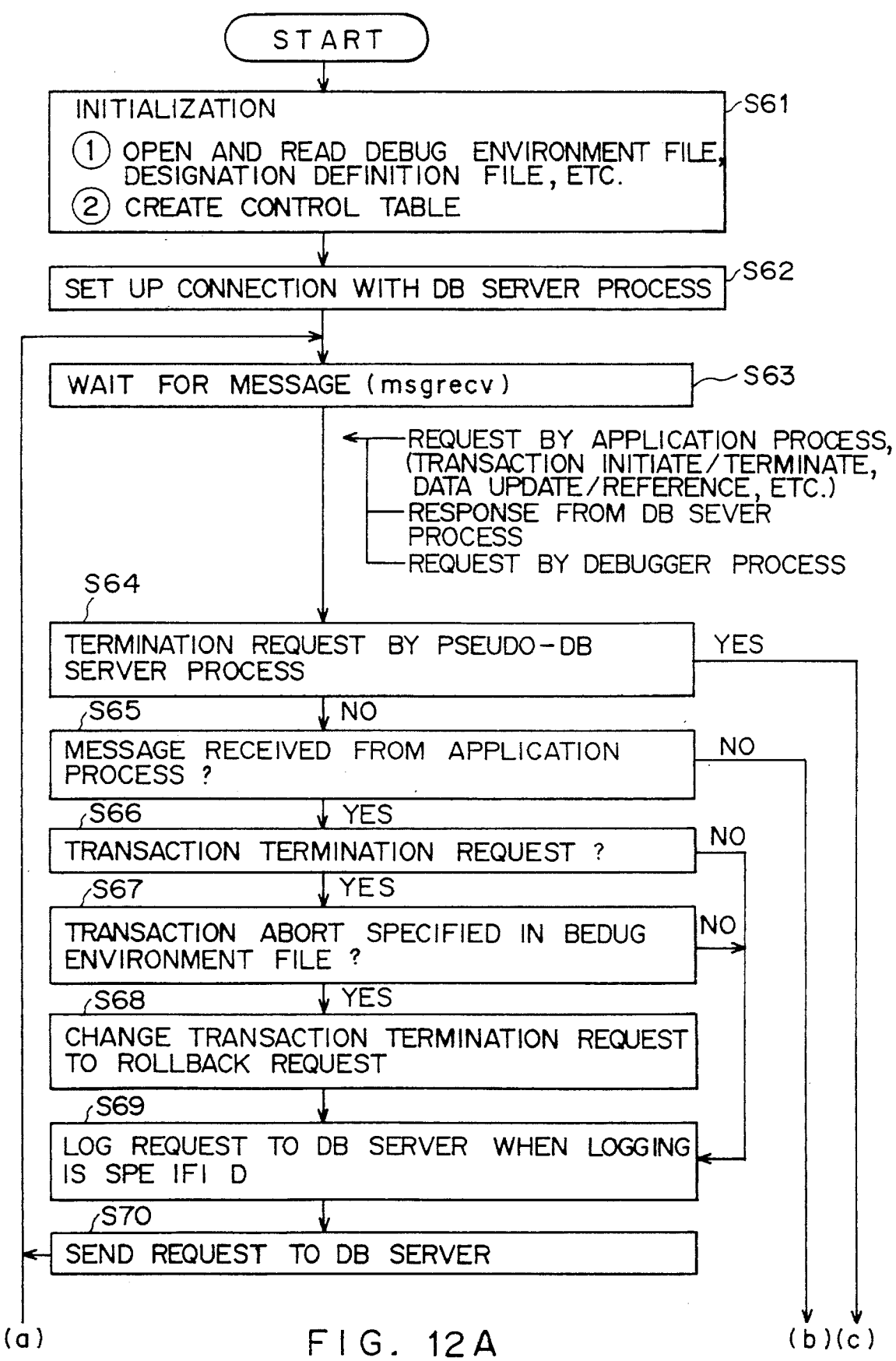
FIGS. 12A, 12B, 12C and 12D are a flowchart for a pseudo-database server process.
Figure 12B:
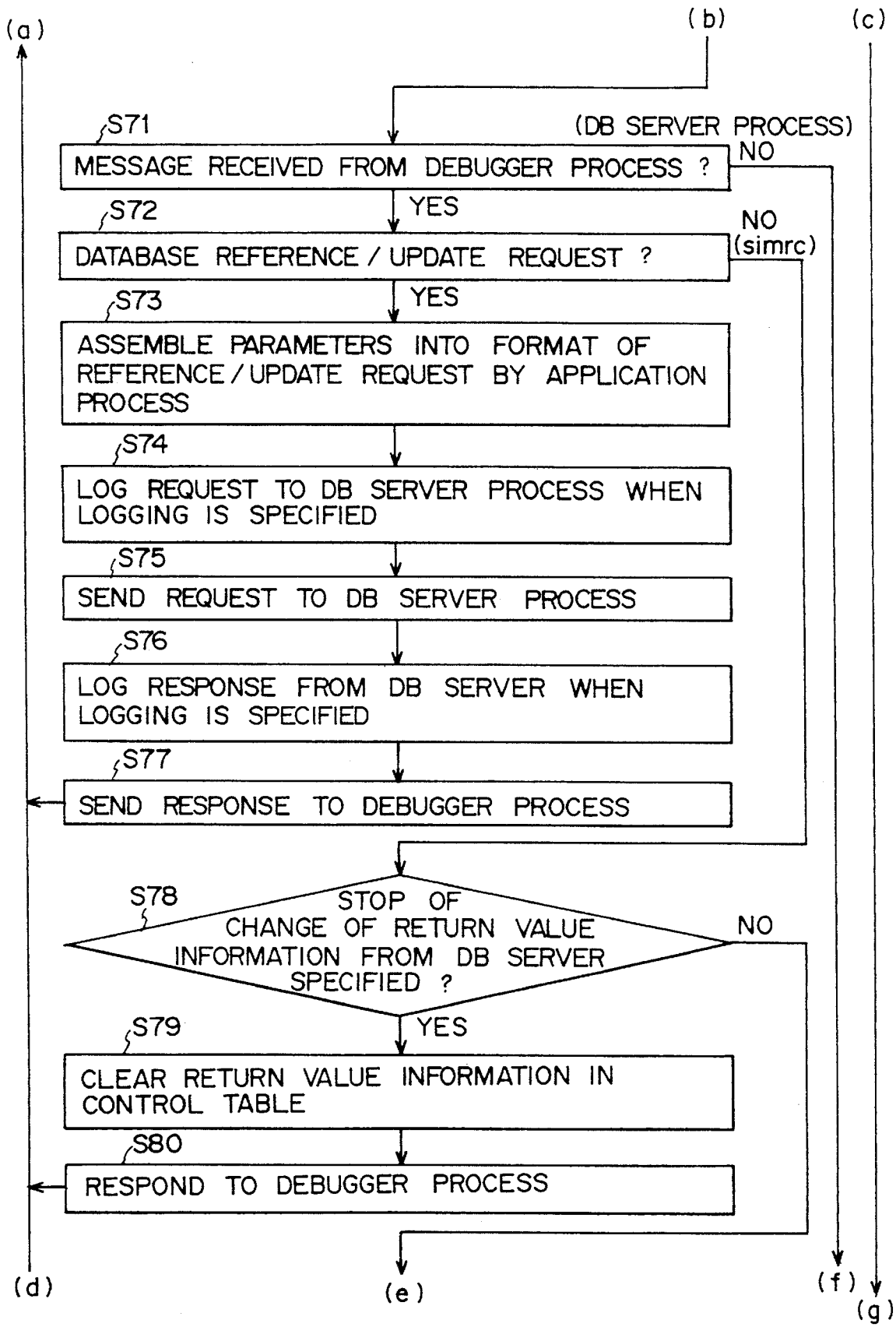
Figure 12C:
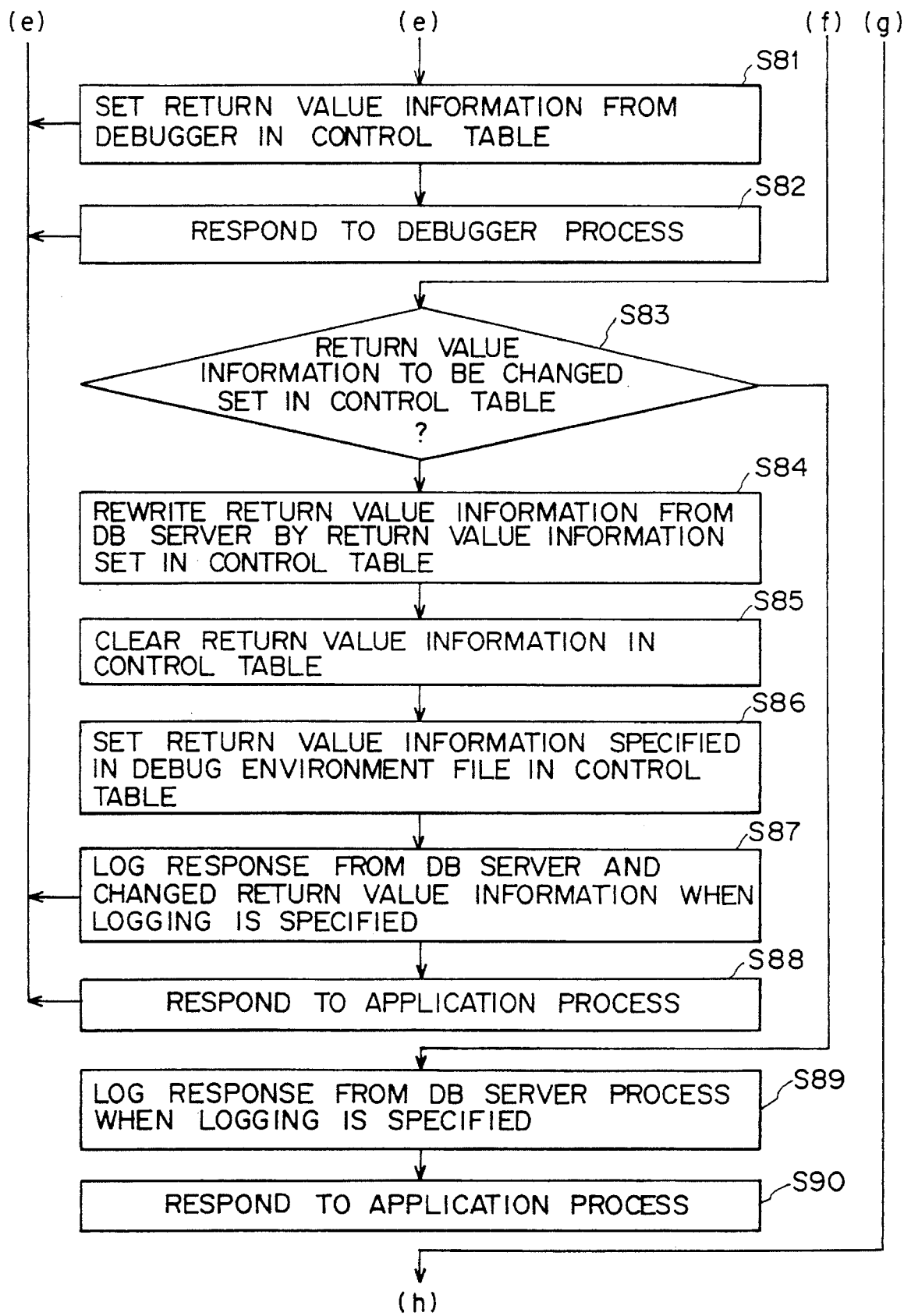
Figure 12D:
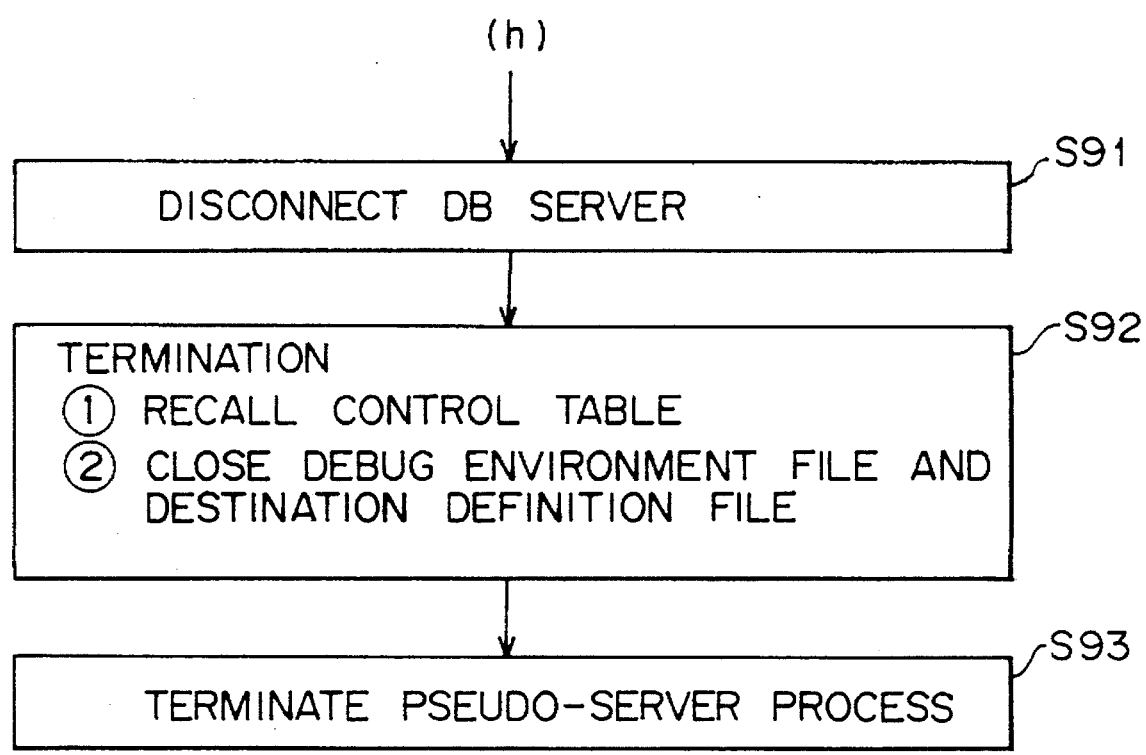

Referring now to FIGS. 11A and 11B, there is illustrated a flowchart for the application process 32P according to the present invention.

When created, the application process 32P first makes a decision as to whether or not the address (port number) of the database (DB) server process (either the pseudo-database server process 33P or the database server 34P in this case) has been specified in the environment variable that the process 32P takes over from its parent process, or the debugger process 31P (S31).

If that address has been specified (yes in step S31), then the application process reads it from the environment variable (S32) and then establishes a connection with the database server process using the address (S34).

If, on the other hand, the decision in step S31 is that the address of the database server process is not specified, then the application process reads the address (port number) of the database server process 34P from the destination definition file 80 (S33) and then sets up a connection with the database server process 34P using the address (S34).

Thus, the application process 32P prioritizes the address (port number) set in the environment variable to establish a connection with the database server process. In the present embodiment, the debugger process 31P sets the address of the pseudo-database server process 33P in the environment variable; hence, at the debug time, the application process 32P considers the pseudo-database server process 33P as the database server process and establishes a connection with it. At the time the system is actually in operation, on the other hand, the application process 32P establishes a connection with the database server process 34P specified in the destination definition file 80. Even if, therefore, the processes for steps S31 through S34 have been incorporated into the application 32 beforehand, there is no need of making changes to this portion when it is installed in a target system.

Next, the database manipulation by the application process 32P will be described. The application process 32P creates parameters of a database manipulation instruction which is requested to the database server process (S41) in accordance with the description of the application 32. The database manipulation instruction thus created is sent to the pseudo-database server process 33P or the server process 34P with which the connection has been set up in the above manner (S42). As described above, at the debug time, the connection with the pseudo-database server process 33P is set up. Thus, at this point the application process 32P will request the pseudo-database server process 33P to manipulate the database.

After that, the application process receives a response message from either the database server process 34P or the pseudo-database server process 33P with which the connection has been set up (S43). The results of the execution of that database manipulation instruction are fetched from the response message, and then a decision is made as to whether the return value indicates either "normal termination" or "abnormal termination" (S44). Next, either "processing for normal termination" (S45) or "processing for abnormal termination" (S46) is performed according to the result of that decision. After that, an editor is invoked to output the processing result to a display or printer not shown on the server machine 30 (S47).

The above processes in steps S41 through S47 are performed each time a database manipulation event occurs. When the termination of the process 32 is specified, the connection with either the database server process 34P or the pseudo-database server process 33P is disconnected (S51). In this case, the application 32 may undo itself to free a system resource.

Thus, the application 32 references either the environment variable or the destination definition file 80 and makes a request for database manipulation to the pseudo-database server process 33P when it is created by the debugger process 31P or the database server process 34P when it is initiated by an end user at the time the system is in operation.

Next, the operation of the pseudo-database server process 33P which operates as a server for the application process 32P and the debugger process 31P and as a client for the database server process 34P will be described with reference to FIGS. 12A, 12B, 12C and 12D.

When created and initiated by the debugger process 31P, the pseudo-database server process 33P first performs initialization (S61).

The initialization consists mainly of the following two processes:

(1) Open the debug environment file 60, destination definition file 80 and the test result log file 70. As a result, operating conditions including whether a transaction is to be committed or aborted, whether test data is to be logged or not, a database manipulation instruction to simulate a return value, and its simulation value are read from the debug environment file 60. The port number (address) of the database server process 34P is read from the file 80. The test result log file 70 is initialized.

(2) Create a control table on main storage and develop data specifying the various operating conditions read in the above process (1) in that table.

Subsequently, the address of the database server process 34P is read from the control table, so that the connection between the pseudo-database server process and the database server process is set up (S62).

The pseudo-database server process 33P is placed in the wait state for receipt of a message from the processes 31P, 32P and 34P with which the connection has been set up (S63).

Upon receipt of a message, the pseudo-database server process 33P examines its contents and makes a decision as to whether or not it is a request from the debugger process 31P for termination thereof (S64). When a quit command is entered, the debugger process 31P sends a request (a request for its termination) specified by the quit command to the pseudo-database server process 33P.

If the decision in step S64 is that the message is not a request for debugger process termination, a decision is next made as to whether the message was sent from the application process 32P (S65). If the decision is that the message was sent from the application process, a decision is further made as to whether that message is a request for transaction termination (S66). If the message is a request other than the request for transaction termination, then the control table is referenced to examine whether logging is specified. If specified, the request from the application process 32P to the database server process 34 is logged in the test result log file 70 (S69). After that, the request is sent to the database server process 34P (S70). The procedure then returns to step S63 in which the pseudo-database server process is again placed in the wait state for an incoming message.

By step S70, a transaction initiation request, a database reference and update request and the like from the application process 32P can be sent to the database server process 34P. These requests will be logged in the test result log file 70 in step S69.

If, on the other hand, the decision in step S66 is that the request is a transaction termination request, then a reference is made to the control table to examine whether the transaction is specified to abort (S67). If the abort is specified, then the transaction termination request is changed to a rollback request (S68).

After that, if the logging is specified, the rollback request is logged in the test result log file 70 (S69), then sent to the database server process 34P (S70).

As a result, the transaction of the application process 32P is made invalid by the database server process 34P.

Thus, the pseudo-database server 33P operates as if it were the database server process 34P for the application process 32P, intercepts a transaction initiation/termination request and a database reference/update request by the application process 32P to the database server process 34P and then passes these requests to the database server process 34P. Namely, the pseudo-database server process 33P behaves as a client for the database server process 34P.

If the decision in step S65 is that the received message is not one from the application process 32P, then a decision is further made as to whether that message is one from the debugger process 31P (S71).

If the message is one from the debugger process 31P, then a decision is next made as to whether or not a command (print, set, or the like) for a database reference and update request is set in that message (S72). When such a command is set (yes in step S72), it is changed to the format acceptable to the application programming interface (API) with the database server process 34, or the format identical to that of a database manipulation instruction issued by the application process 32P (S73). If logging is specified in the control table, the resulting database manipulation instruction (a request for database manipulation) is logged in the test result log file 70 (S74), then sent to the database server process 34P (S75).

Upon receipt of a response message to the received message from the database server process 34P, the pseudo-database server process references the control table to examine whether logging is specified. When specified, the response message is logged in the test result log file 70 (S76). After that, the results of the execution of the instruction, included in the response message, are sent to the debugger process 31P (S77). The procedure then returns to step S63, so that the pseudo-database server process is again placed in the wait state for an incoming message.

If, in step S72, a command other than a database reference and update command, i.e., the simrc command, is set in the incoming message (no in S72), then the simrc command is analyzed to make a decision as to whether or not a halt of simulation to change a return value from the database server process 34P is specified (S78). If specified (yes in step S78), all the changed return value information set in the control table is cleared (S79) and then a response message to the simrc command is sent to the debugger process 31P (S80). The procedure returns to step S63 in which the pseudo-database server process waits for an incoming message.

The changed return-value information on thee control table can be cleared by the simrc command in that way. Thus, the entry of the simrc command prior to the execution of a database manipulation instruction in which its associated return value is specified to be changed in the debug environment file 60 could make invalid the simulation of the return value for the database manipulation instruction.

If, on the other hand, the simrc command is not the one that specifies a return value being changed but the one formatted as shown in FIG. 9 (no in step S78), then return value information specified by that simrc command is set in the control table after it has been cleared (S81). And then, a response to the simrc command is sent to the debugger process 31P (S82).

Thus, the entry of an simrc command from the terminal 50 permits a return value for a database manipulation instruction issued by the application process 32P and executed on the next line to be changed to a desired value. This is effective in testing for errors of database manipulation instructions for which no change to return values is specified in the debug environment file 60.

If, on the other hand, the incoming message is not the one from the debugger process 31P but the one from the database server process 34P (no in step S71), the pseudo-database server process references the control table and makes a decision as to whether or not it is specified that return information from the database server process 34P should be changed (S83).

If specified (yes in step S83), then the value of the return information from the database server process 34P is changed to a value specified in the control table (S84).

This change processing consists of the following processes:

(1) If a command (simrc command) that describes a change to the value of return information for a database manipulation instruction that the database server process 34P is requested to execute is received from the debugger process 31P immediately prior to receipt of that database manipulation instruction from the application process 32P, the command from the debugger process 31P takes precedence over the specification in the debug environment file 60. As a result, the return information is changed to a specified value. This process is performed by entering a return-value changing simrc command from the terminal 50 immediately before a database manipulation instruction is issued by the application process 32P to the pseudo-database server process 33P.

(2) For return information for database manipulation instructions that the database server process 34P is requested to execute without being told by the debugger process 31P to change return information value, a reference is made to the return value information in the debug environment file 60 which is now developed in the control table. For a database manipulation instruction for which a change to return information is specified in the control table, its return information is changed to a specified value in the control table.

After that, the changed return value is deleted from the control table (S85) and then the return value information specified in the debug environment file 60 is set in the control table (S86).

Thereby, simrc-command-specified return value information set in the control table is made valid only for a database manipulation instruction that is executed after the simrc command. For subsequent database manipulation instructions the return value information specified in the debug environment file 60 is made valid again.

Next, if logging is specified in the control table, a response message from the database server process 34P and changed return information are logged in the test result log file 70 (S87). The pseudo-database server process changes the response message having the changed return information to its message and sends that message to the application process 32P (S88).

If, on the other hand, the decision in step S83 is that no change to return information is specified, then the control table is referenced to examine whether logging is specified or not. A response message from the database server process 34P is logged only when logging is specified (S89). The pseudo-database sever process changes the response message to its message and sends the changed message to the application process 32P (S90).

After the termination of execution of step S88 or S90, the procedure returns to step S63 in which the pseudo-database server process is placed in the wait state for an incoming message.

When receiving a termination request from the debugger process 31P in step S64, the pseudo-database server process disconnects the connection with the database server process 34P (S91), then performs termination processing (S92). In this termination processing, the pseudo-database server process performs the following processes:

(1) Recalling the control table.
(2) Closing the debug environment file 60, the destination definition file 80, and the test result log file 70.

Then, the pseudo-database server process terminates itself (S93).

Thus, upon receipt of a transaction termination request (transaction termination instruction) from the application process 32P when a transaction abort is specified in the debug environment file 60, the pseudo-database server process 33P requests the database server process 34P to execute an abort instruction (rollback). In response to this, the database server process 34P performs rollback on a transaction processed by executing a database manipulation instruction issued by the application process 32P and returns the database 40 to the state prior to the initiation of that transaction. For this reason, the contents of the database 40 can be protected against destruction by a test of the application 32.

For database manipulation instructions for which a change to return value is specified in the debug environment file 60 or database manipulation instructions for which a request to change a return value is made by the debugger process 31P immediately before execution requests are made by the application process 32P, the pseudo-database server process 33P changes return values in response messages for the execution of these instructions from the database server process 34P to specified values, each of the return values indicating the results of the execution of a respective individual one of the instructions. The pseudo-database process then presents these changed return values to the application process 32P. For this reason, a test for abnormal return of the application 32 from the DBMS can be made easily without making any modification to the application 32.

Moreover, the pseudo-database server process 33P operates as a client process for the database server process 34P and passes a database manipulation instruction from each of the application process 32P and the debugger process 31P to the database server process 34P within the same transaction. Thus, the person in charge of testing the application 32 is allowed to reference the contents of the database 40 updated by the application process 32P during the execution of the transaction in real time via the debugger process 31P. In addition, he or she is also allowed to update any data in the database 40 via the debugger process 31P during the execution of the transaction. For this reason, it becomes possible to increase the efficiency in developing the application 32 and the DB server (DBMS) 34.

Furthermore, when test-data logging is specified in the debug environment file 60, the pseudo-database server process 33P logs a database manipulation instruction issued by the application process 32P or the debugger process 31P and a response message issued by the database server process 34P for the execution of that instruction in the test result log file 70. As a result, the contents of the file 70 can be dumped to verify the operation of the application 32 in its entirety.

Figure 13:
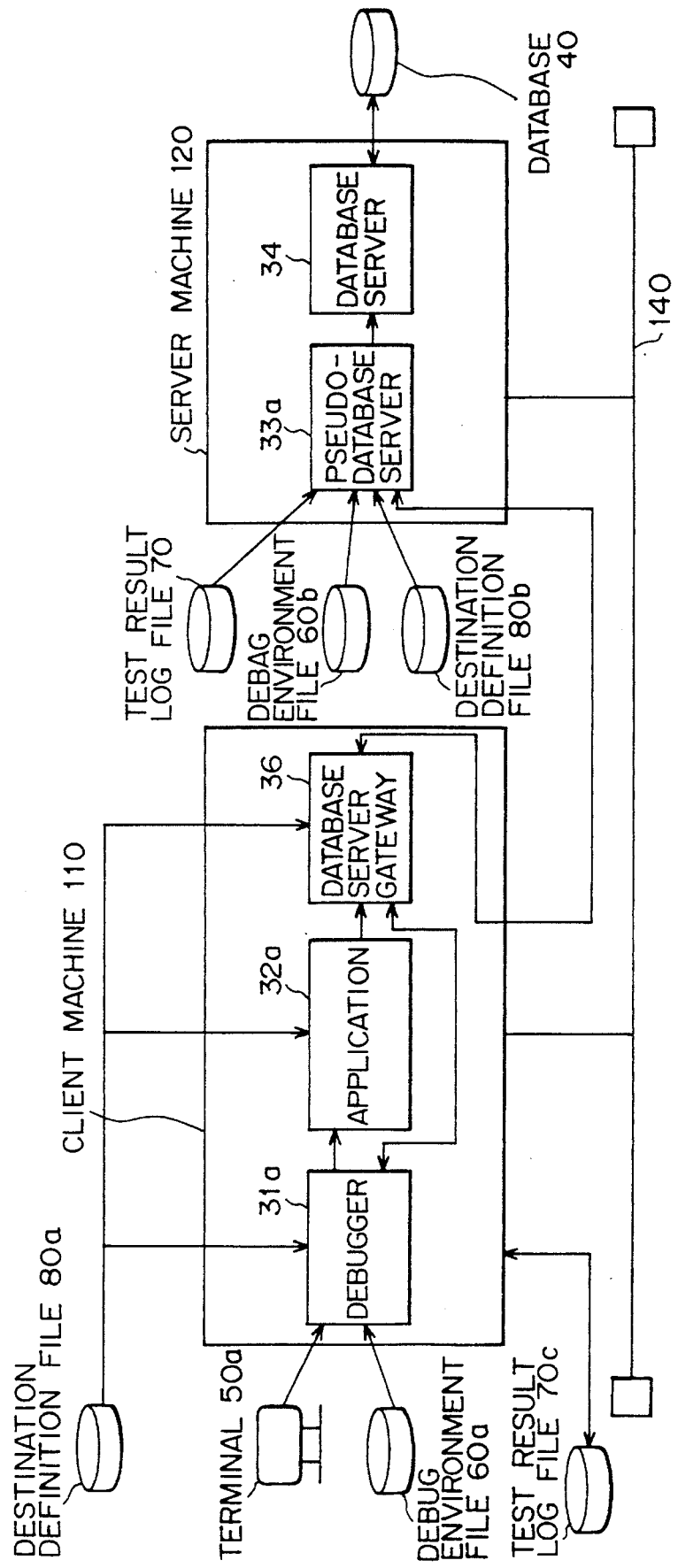
FIG. 13 shows a system configuration according to a second embodiment of the present invention.

Referring to FIG. 13, there is illustrated a client/server database system according to a second embodiment of the present invention.

In this system, a client machine 110 and a server machine 120 are interconnected via a local area network (LAN) 140. For example, the client machine may comprise a personal computer (PC), a work station (WS) or the like, whereas the server machine may comprise a UNIX machine.

In the client machine 110 are installed pieces of software of a debugger 31a, an application 32a, and a database server gateway 36. The debugger 31a and the application 32a respectively function identically to the debugger 31 and the application 32 of FIG. 5. That is, a debugger process (an execute form of the debugger 31a on the client machine 110) is initiated by an operator at a terminal 50A on the client machine side. When initiated, the debugger process references a debug environment file 60a to create an application process (an execute form of the application 32a on the client machine 110). The debug environment file 60a, having the same contents as the debug environment file 60 of FIG. 6, maintains the name of the application 32a which is a candidate for testing.

A destination definition file 80a on the client machine side, as shown in FIG. 14, maintains the service name (dbsv-gw) of the database server gateway 36, gateway address information comprising an IP address (204, 321, 34, 56) and a port number (100), and a specified protocol (tcp) used by the gateway for interprocess communications, in addition to the contents of the destination definition file 80 in the first embodiment. The application process and the debugger process references this destination definition file to set up a connection with the database server gateway process.

In the server machine 120, on the other hand, pieces of software of a pseudo-database server 33a and a database server 34 are installed. In this system, a pseudo-database server process (an execute form of the pseudo-database server 33a on the server machine 120) is initiated by an operator at the server machine 120. An operating system (OS) installed in the server machine 120 incorporates a communications driver for supporting interprocess communications on the LAN 140. In addition, a destination file 80b having the same contents as the counterpart 80a on the client machine side is installed. Further, a test result log file 70 is installed as in the first embodiment.

A database server gateway process (an execute form of the database server gateway 36 on the client machine 110) installed on the client machine 110 references the destination definition file 80a and establishes the connection with the pseudo-database server process on the server machine 120 via the communications driver by the TCP/IP protocol. The gateway process accepts and analyzes a request for database manipulation (a database access request or a transaction control request) from the application process or the debugger process. After analysis, the gateway process sends a message describing the database manipulation request to the pseudo-database server process.

Upon receipt of that message, the pseudo-database server process performs the same processing as the counterpart 33P in the first embodiment. That is, the second embodiment is almost the same as the first embodiment except that the application 32a and the database server 34 are installed on the different machines 110 and 120, and the pseudo-database server process accepts a database manipulation instruction from the application process or debugger process via the LAN 140. In the second embodiment as well, the application 32a can be debugged in the same manner as the first embodiment.

That is, the pseudo-database server process references the destination definition file 80b, thereby establishing the connection with the database server process. By referencing the debug environment file 60*b* the contents of which are almost the same as those of the counterpart 60 shown in FIG. 6 in the first embodiment, the pseudo-database server process logs or aborts a transaction of the application process, simulates return information for a database manipulation instruction issued by the application process, and so on.

In addition, the pseudo-database server process keeps a log of transactions by the application process and the debugger process in the test result log file 70. The contents of the log file are downloaded to the test result log file 70*c* on the client machine side according to the following procedure:

(1) Upon receipt of a log-file download command from the terminal 50A, the debugger process sends to the database server gateway (hereinafter referred to as gateway) a request to merge log data in the test result log file 70.

(2) The gateway process sends a request for transfer of log data stored in the test result log file 70 to the pseudo-database server process via the LAN 140.

(3) Upon receipt of this request, the pseudo-database server process reads the log data from the log file 70, then transfers it to the gateway process via the LAN 140.

(4) The gateway process writes the log data into the test result log file 70*c*. The transfer of the log data is completed with appropriate notification to the debugger process.

The operator on the client machine side is allowed to display the results of a test of the application 32*a* (the contents of messages communicated between the application process and the database server process during the execution of a transaction) stored in the log file 70*c* on the monitor of the terminal 50A for verification.

Note that the operator is allowed to log on the server machine 120 from the terminal 50A to reference the contents of the test result log file 70 with no such file transfer as described above.

A system configuration is also permitted in which no debug environment file is installed on the sever machine side. In this case, it is only required to embed relevant information set in the debug environment file 60*a* on the client machine side in a processing request message sent from the database server gateway to the pseudo-database server process.

The second embodiment is a client/server system in which the server machine 120 and the client machine 110 are interconnected by the LAN 140. However, this is illustrative and not restrictive. The present invention is adaptable to a system in which a server machine and a client machine are interconnected by a wide area network (WAN).

In the above embodiments, the TCP/IP protocol is used for interprocess communications. This is illustrative and not restrictive. Any other communications protocol, such as OSI (Open Systems Interconnection), IPX/SPX (Internetwork Packet Exchange/Sequenced Packed Exchange) or the like, may be used. In addition, the present invention is adaptable to a database system in which a TP monitor is installed.

Note that all programs created to conform to the API (application programming interface) provided by the DBMS (database management system) correspond to the application 32 or 32*a* in the above embodiments. Thus, middle ware located between the DBMS and an application for end users also corresponds to the application.

According to the present invention, the following advantages are obtained.

(1) Even if an application makes access to the DBMS, then references and updates the database for application testing purposes, the database is restored to the state prior to the test initiation at the termination of the test, thus eliminating the need of building a particular database for testing purposes. Moreover, even if a bug occurs actually in a system in operation, a test can be made using the restored database installed in the system. Furthermore, a plurality of applications can be tested by the use of a common database.

(2) The pseudo-database server can be used to pass a return code from the DBMS (database server) to the application with deliberate modification added; thus, a test of processing for abnormal return in the application can be made easily and efficiently. There is no need of modifying the application for this test.

(3) Access to the database by the debugger can be made within the same transaction as the application; thus, the contents of the database can be verified while the transaction is being executed. For this reason, it becomes easy to make sure which of the DBMS and the application caused a fault. Thus, the DBMS developer as well as the application developer is allowed to perform debugging easily.

(4) The pseudo-database server can be used to log messages transmitted to and from the DBMS while a transaction is being executed; thus, the operation of the application can be analyzed in detail by the use of a log of these messages.

Although the preferred embodiments of the present invention have been disclosed and described, it is to be noted that the present invention may be practiced and embodied in still other ways without departing the scope and purpose thereof.

What is claimed is:

1. A method of testing an application in a client/server database system in which said application acts as a client process for a database server process dedicated to manage a database and makes a request to said database server process for database manipulation, comprising the steps of:

creating a pseudo-database server process which acts as a server process for a process of said application and as a client process for said database server process and a debugger process which acts as a client process for said pseudo-database server process and sets a breakpoint in said application process, and wherein, when said application process halts at said breakpoint, said debugger process requests said pseudo-database server process to reference or update said database, and said pseudo-database server process sends said request by said debugger process to said database server process and then sends a response to said request received from said database server process to said debugger process.

2. The method according to claim 1, wherein said debugger process sets said breakpoint in said application process and makes a database reference or update request as instructed by a command entered from a terminal.

3. The method according to claim 1, wherein said application process acquires destination information required for interprocess communications with said pseudo-database server process on which a database manipulation request is made from environment variables.

4. The method according to claim 3, wherein said debugger process sets destination information of said pseudo-database server process in said environment variables and then creates said application process.

5. The method according to claim 4, wherein said application process acquires said destination information from a destination definition file when it is not set in said environment variables.

6. The method according to claim 1, wherein said database, said database server process and said pseudo-database server process are installed on a server machine, and said application process and said debugger process are installed on a client machine connected to said server machine via a network, and wherein communications means is further provided which permits message communications between said application process or said debugger process and said pseudo-database server process.

7. A device for supporting a test of an application in a client/server database system including a database in which said application makes a request for database manipulation, comprising:

database server means for receiving a database manipulation request, managing said database in accordance with said database manipulation request and for returning a response message;

pseudo-database server means which acts as a server for said application and as a client for said database server means; and debugger means which acts as a client for said pseudo-database server means and sets a breakpoint in said application, and wherein, when said application halts at said breakpoint, said debugger means requests said pseudo-database server means to reference or update said database, and said pseudo-database server means sends said request by said debugger means to said database server means and then sends a response to said request received from said database server means to said debugger means.

8. The device according to claim 7, wherein said database, said database server means and said pseudo-database server means are installed on a server machine, and said application and said debugger means are installed on a client machine connected to said server machine via a network, and wherein communications means is further provided which permits message communications between said application or said debugger means and said pseudo-database server means via said network.

* * * * *